United States Patent [19]

Haig

[11] Patent Number: 4,763,949

[45] Date of Patent: * Aug. 16, 1988

[54] SUNROOF CONTROLLER

[75] Inventor: Laurence B. Haig, Rosville, Mich.

[73] Assignee: Cre-Del Limited Partnership, Muskegon, Mich.

[ * ] Notice: The portion of the term of this patent subsequent to Sep. 2, 2003 has been disclaimed.

[21] Appl. No.: 884,216

[22] Filed: Jul. 10, 1986

Related U.S. Application Data

[63] Continuation-in-part of Ser. No. 551,472, Nov. 14, 1983, Pat. No. 4,609,223.

[51] Int. Cl.$^4$ ............................ B60J 7/053; B60J 7/19
[52] U.S. Cl. .................................. 296/222; 296/224; 296/221
[58] Field of Search ................ 551/472; 296/216, 221, 296/222, 224

[56] References Cited

U.S. PATENT DOCUMENTS

| Re. 28,346 | 2/1975 | Kouth et al. | 296/221 |
|---|---|---|---|
| 2,156,615 | 5/1939 | Bishop | 296/222 |
| 2,338,225 | 1/1944 | Ball | 296/222 |
| 2,661,234 | 12/1953 | Bishop | 296/224 |
| 2,774,624 | 12/1956 | Lower | 296/223 |
| 2,941,840 | 6/1960 | Golde | 296/222 |
| 3,025,099 | 3/1962 | Werner | 296/222 |
| 3,572,822 | 3/1971 | Schmid | 296/221 |
| 3,829,155 | 8/1974 | Lutz | 296/221 |
| 3,981,531 | 9/1976 | Koral et al. | 296/222 |
| 4,245,864 | 1/1981 | Shitanoki | 296/222 |
| 4,342,482 | 8/1982 | Koral et al. | 296/221 |
| 4,403,805 | 9/1983 | Strem, Jr. et al. | 296/222 |
| 4,420,184 | 12/1983 | Kaltz et al. | 296/222 |
| 4,422,687 | 12/1983 | Kaltz et al. | 296/222 |
| 4,609,223 | 9/1986 | Haig | 296/222 |

FOREIGN PATENT DOCUMENTS

| 59902 | 9/1954 | France | 296/222 |
|---|---|---|---|
| 864043 | 3/1961 | United Kingdom | 296/222 |
| 2040355 | 8/1980 | United Kingdom | 296/222 |

Primary Examiner—Dennis H. Pedder
Attorney, Agent, or Firm—Price, Heneveld, Cooper, DeWitt & Litton

[57] ABSTRACT

A controller is provided for vehicle sunroofs and the like, of the type having a retractable closure. The controller comprises two tracks mounted on opposite sides of a main frame. Guides project laterally outwardly from the sides of the closure, and are received in mating channels in the tracks to slidingly support the closure for fore-to-aft translation between fully open and fully closed positions. A seal is positioned between the closure and the frame to form a weathertight seal therebetween. A pair of cam mechanisms are positioned in mating grooves in the tracks, and are shaped so that rotation of the cam mechanisms raises the closure into a fully closed and locked position. The controller also includes a first lock to releasably retain the closure in one of a plurality of different partially open positions, and a second lock to releasably retain the closure in the fully open position.

65 Claims, 10 Drawing Sheets

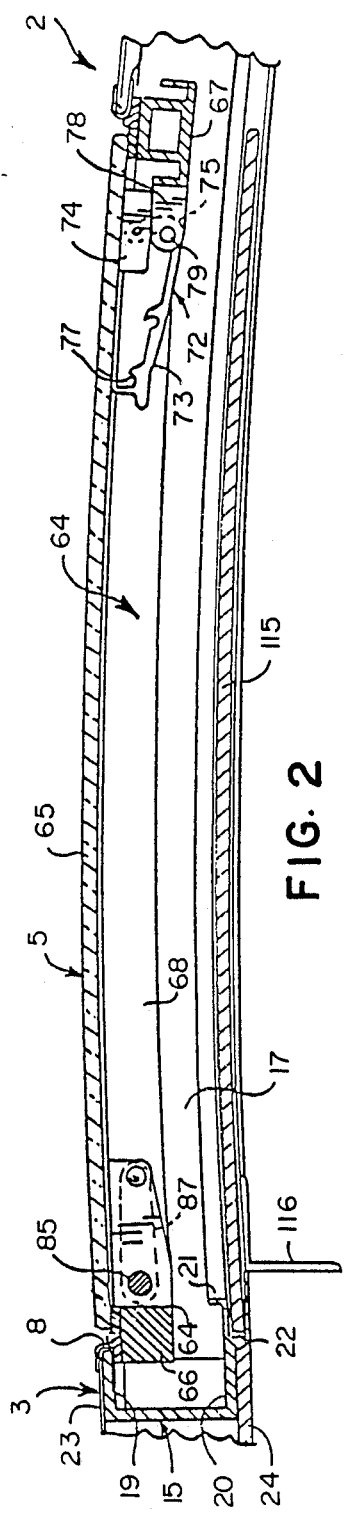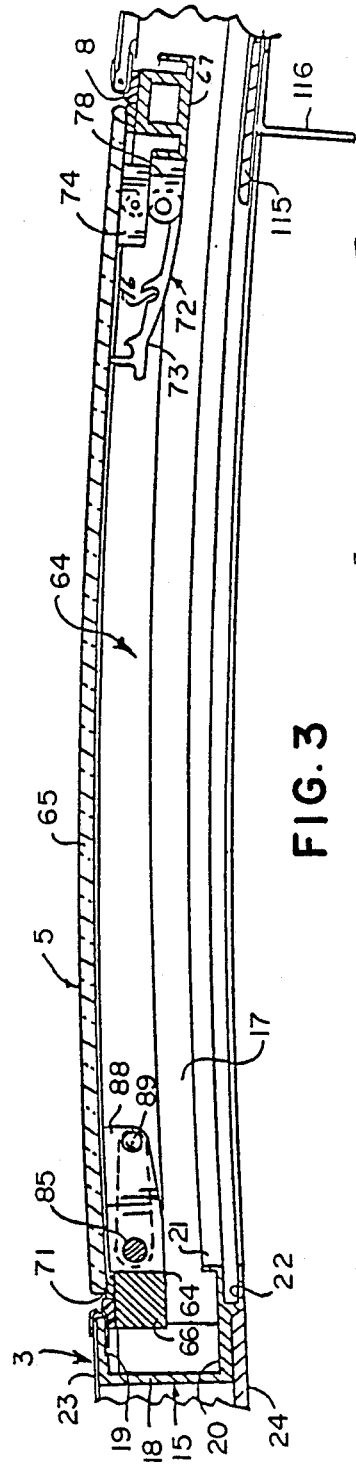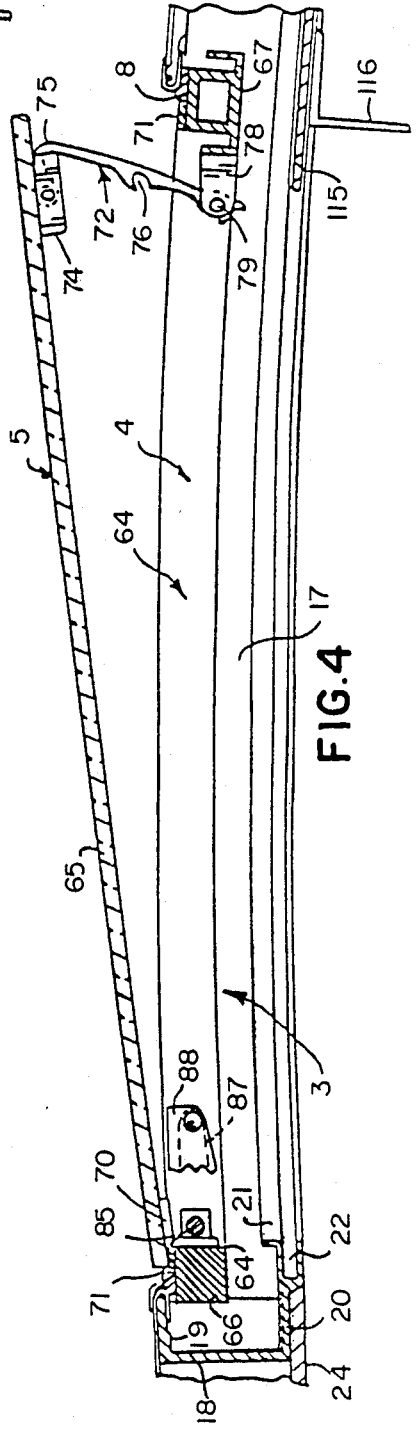

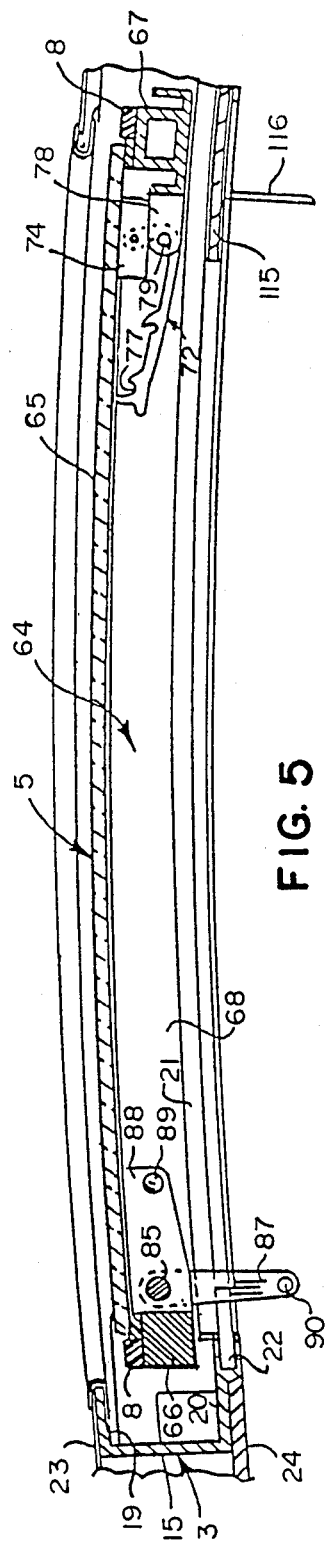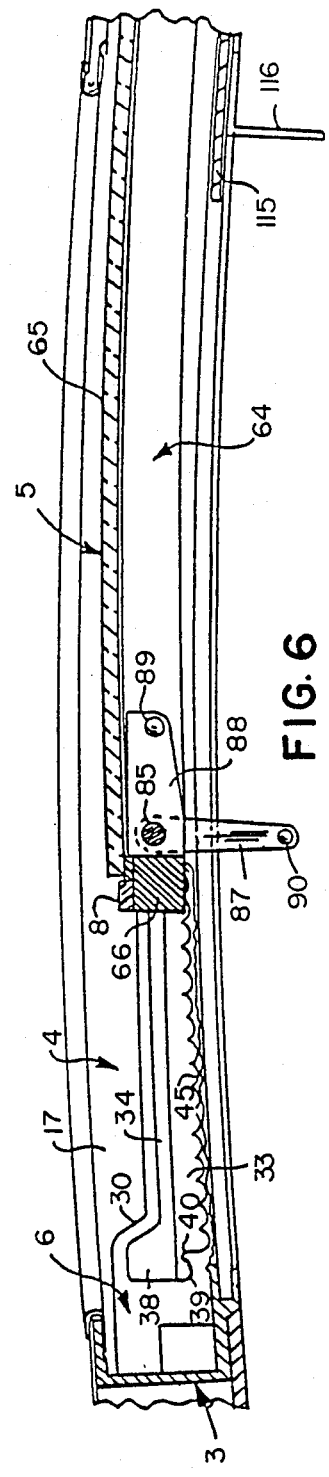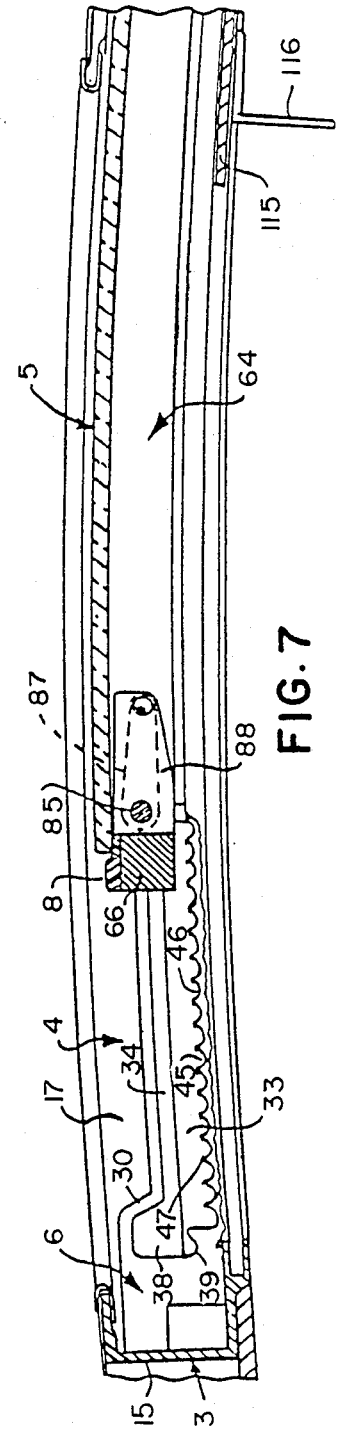

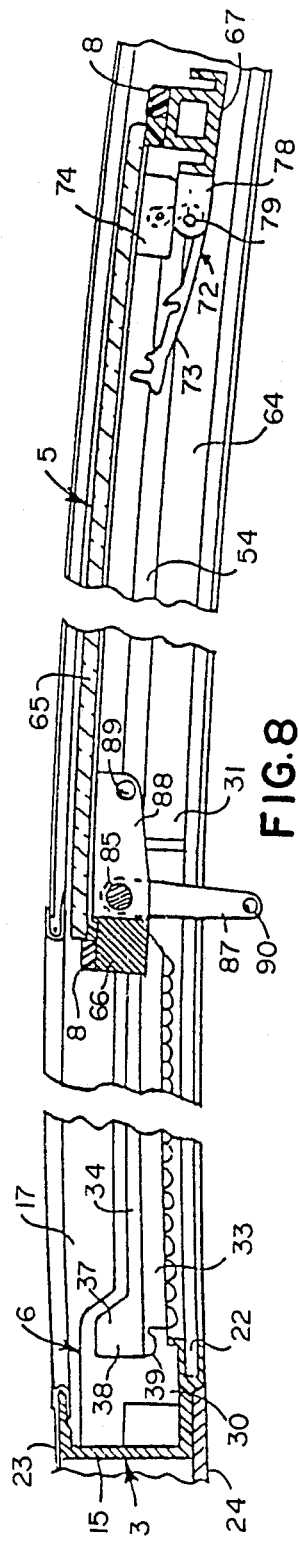
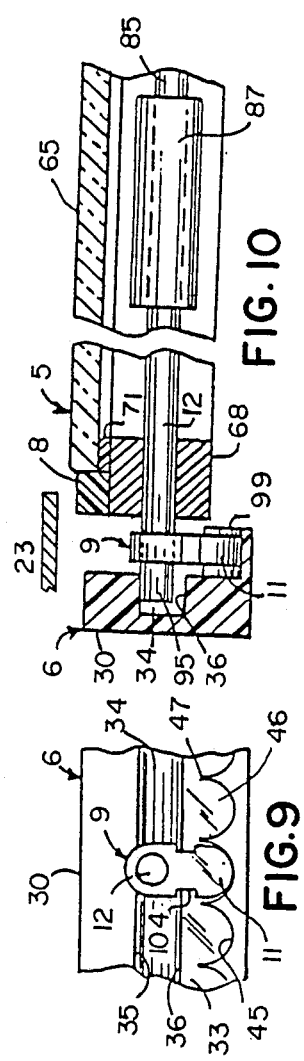
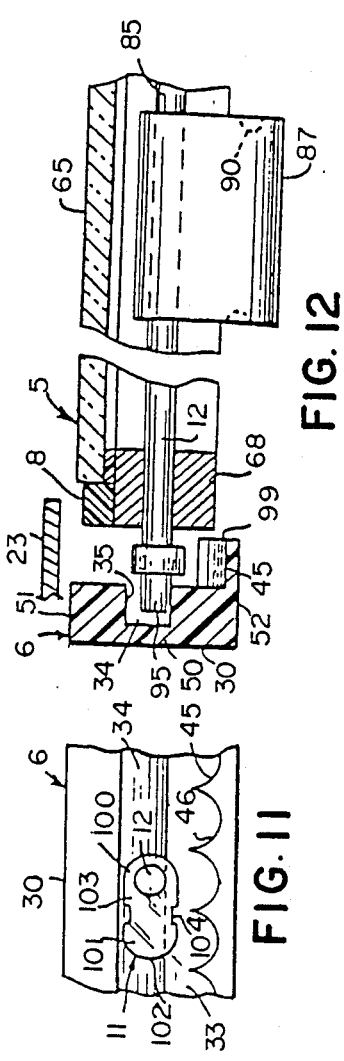

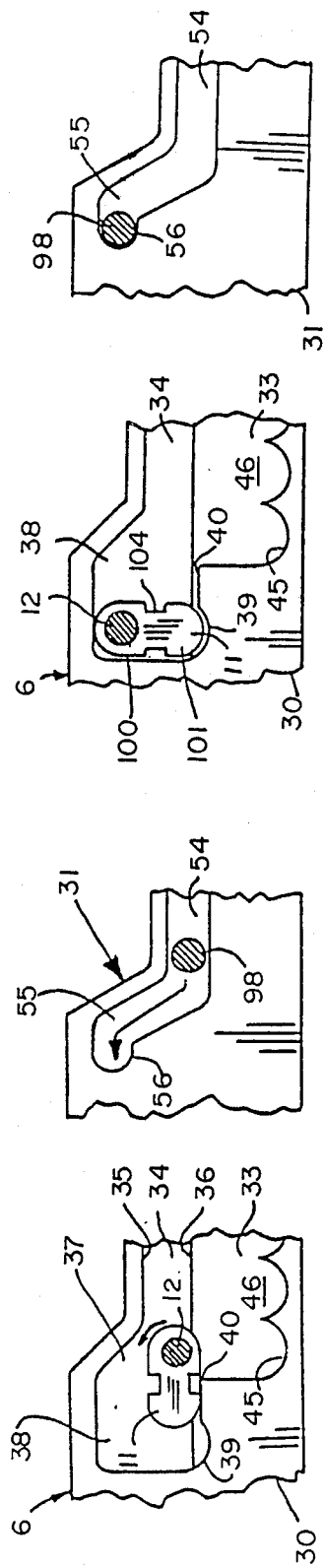
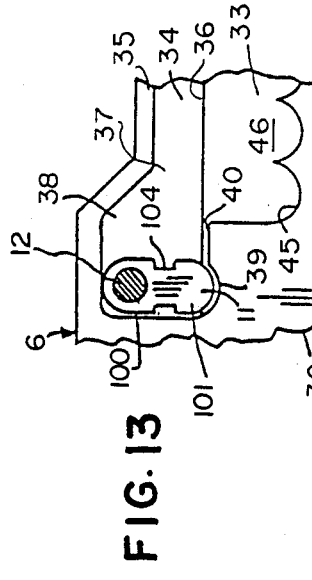
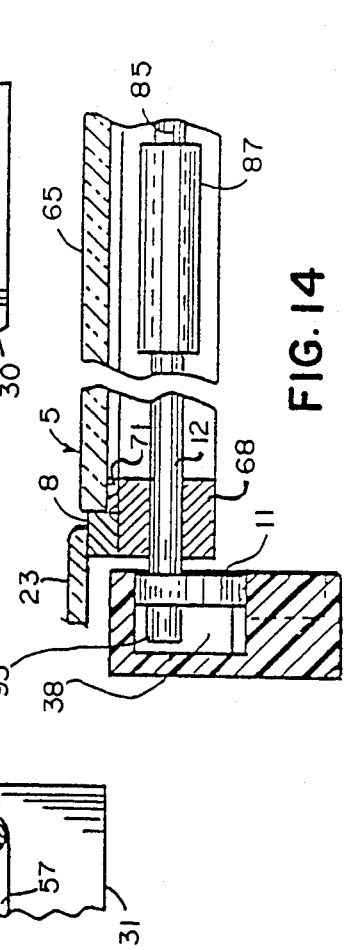
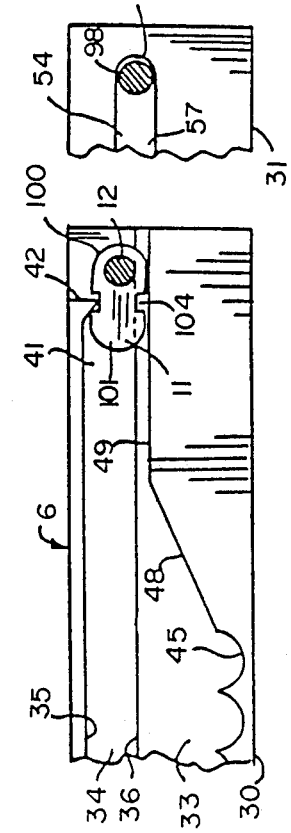

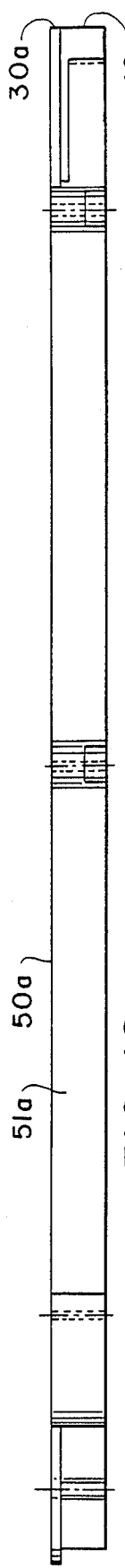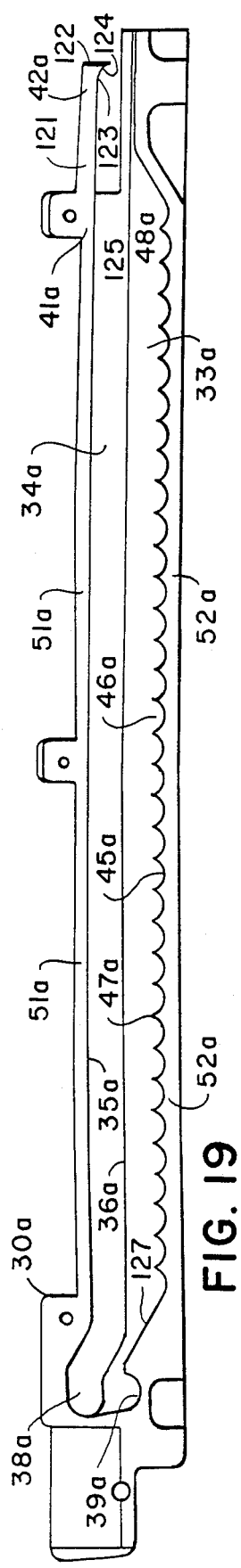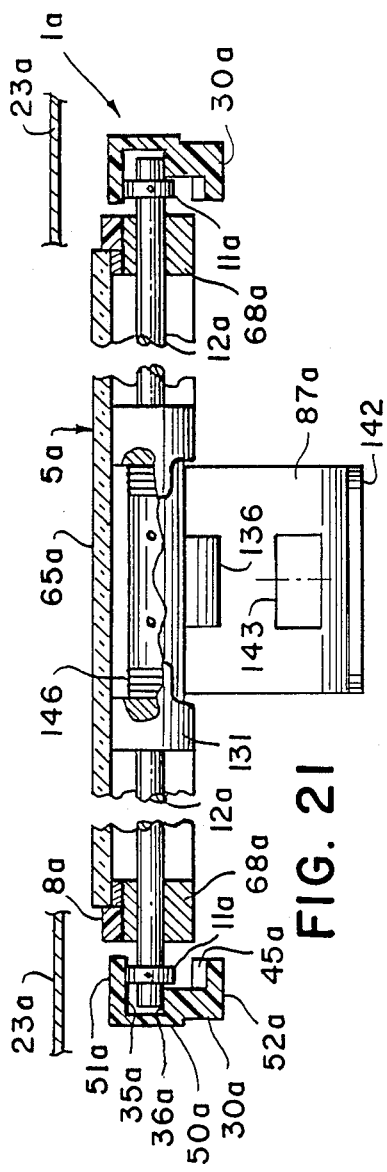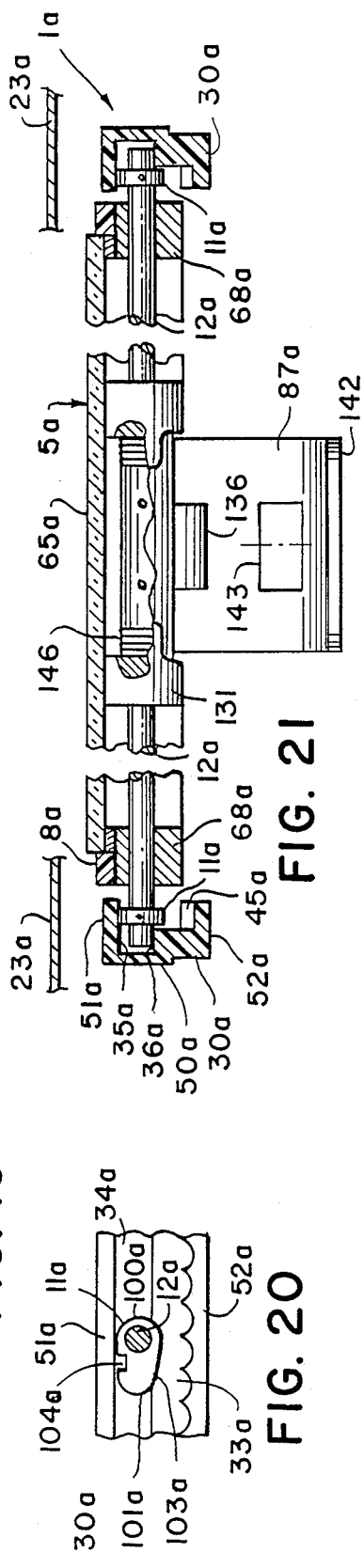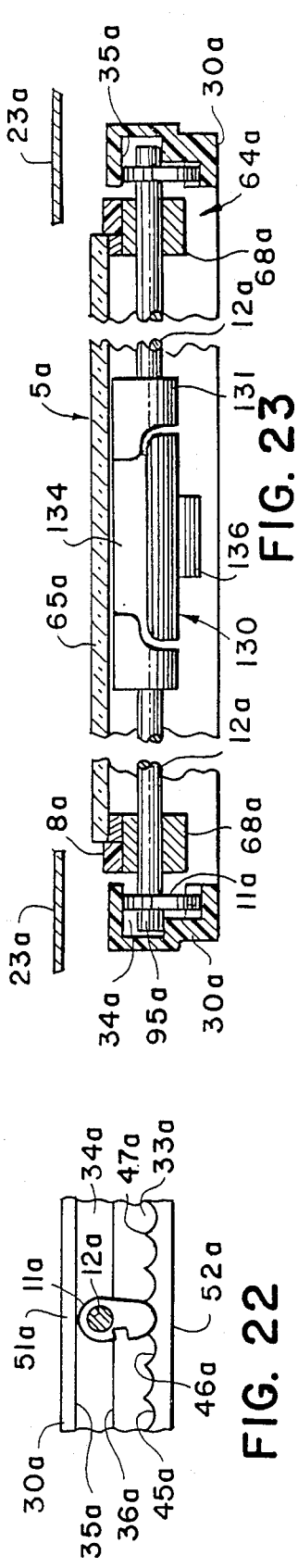
FIG. 18
FIG. 19
FIG. 20
FIG. 21
FIG. 22
FIG. 23

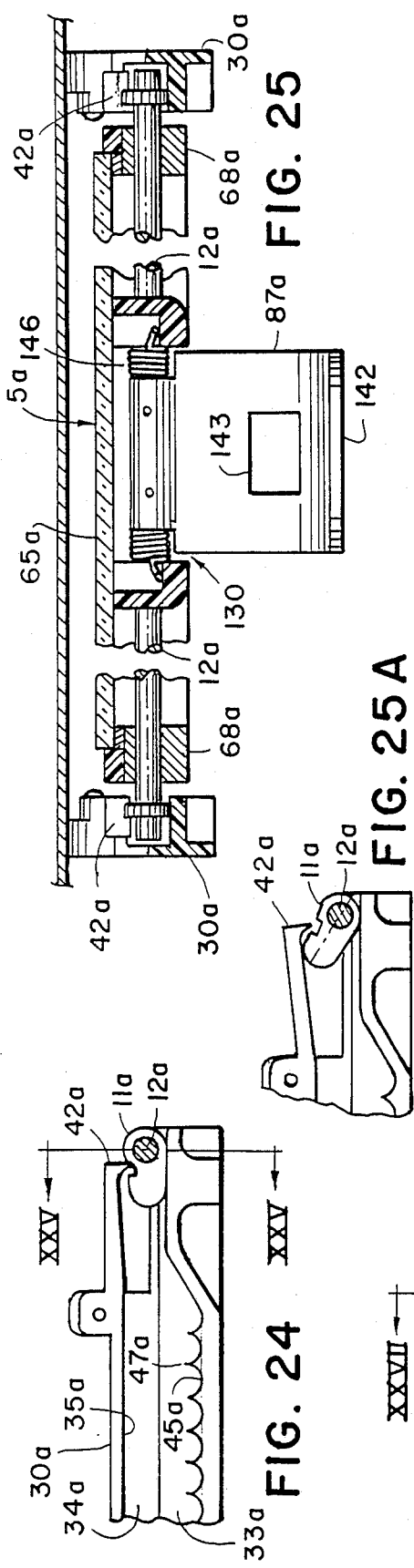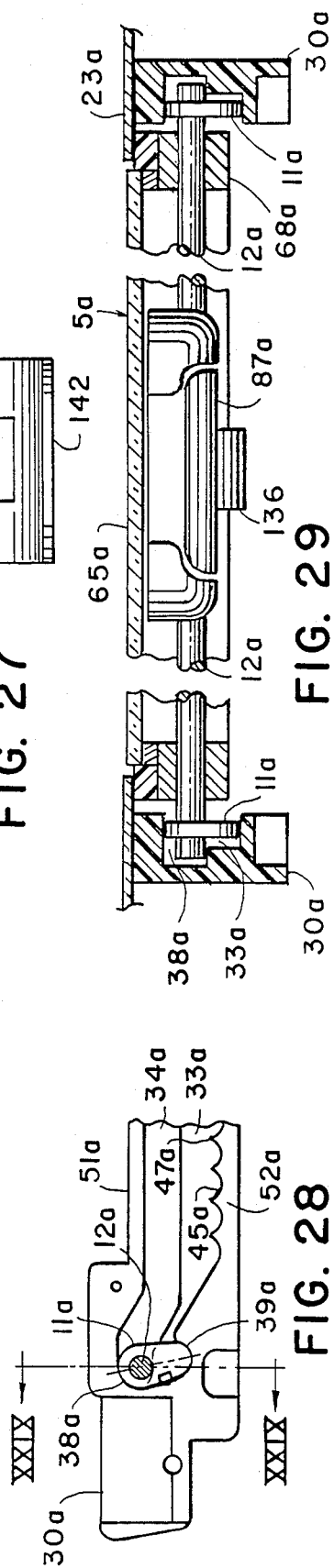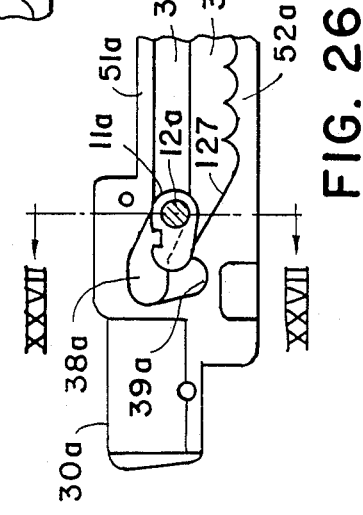

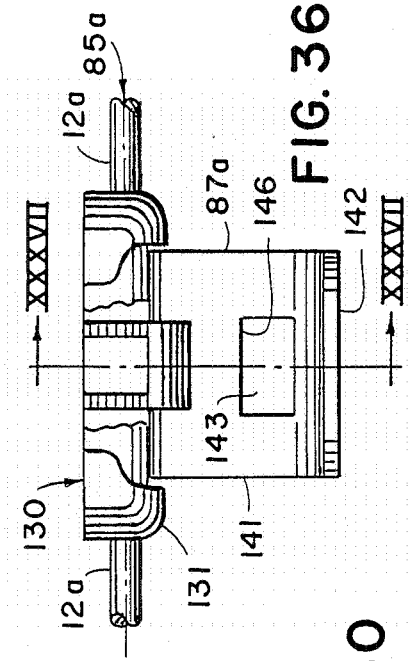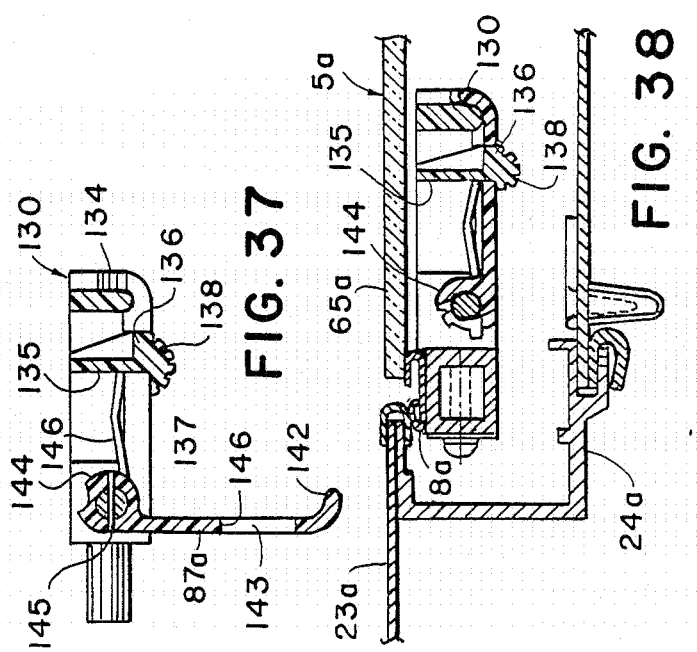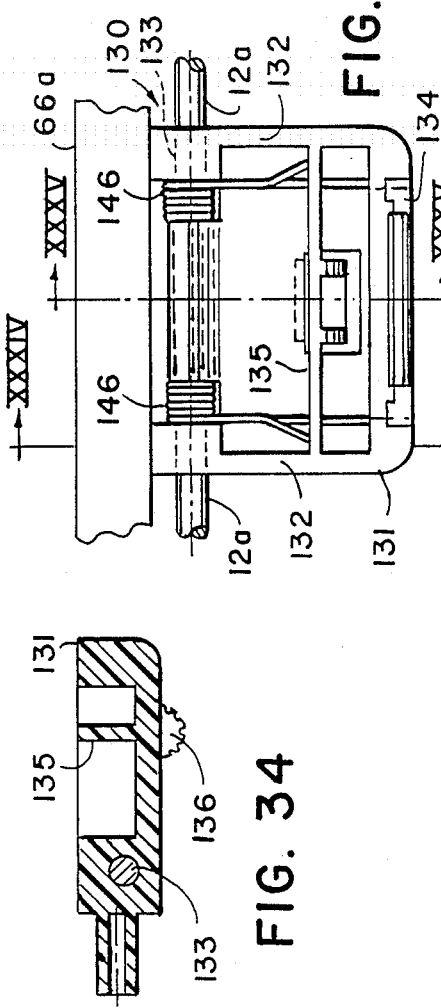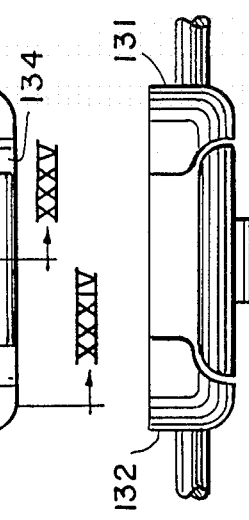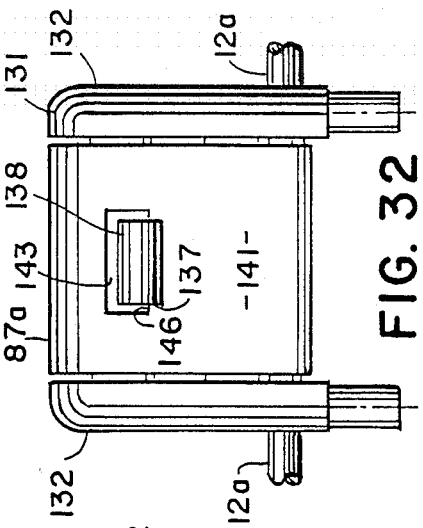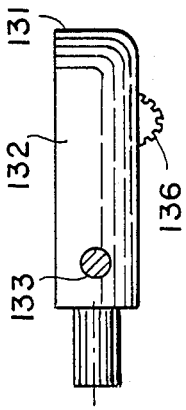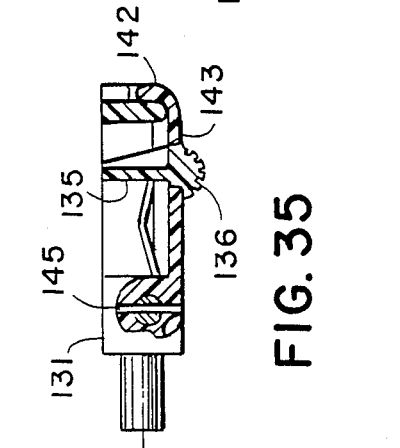

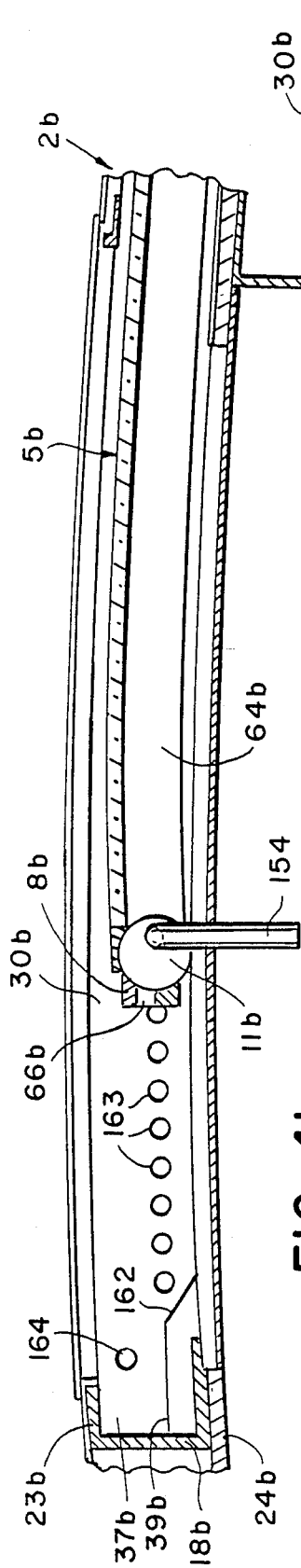
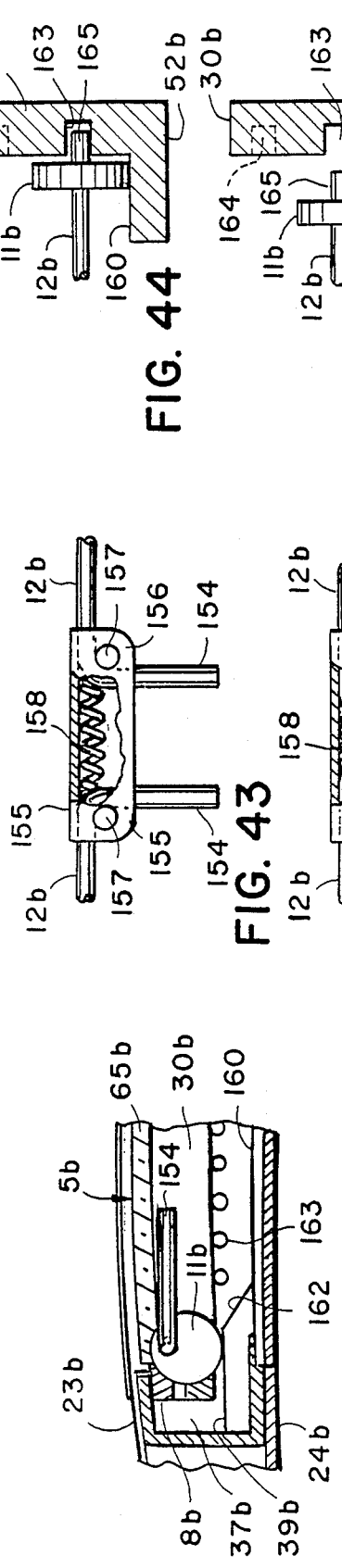
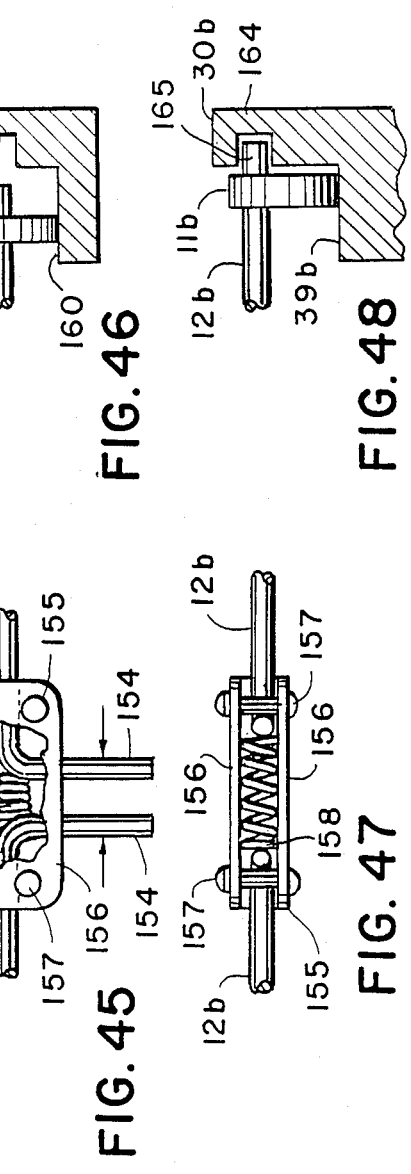

SUNROOF CONTROLLER

CROSS REFERENCE TO RELATED APPLICATIONS

The present application is a continuation-in-part of my U.S. patent application Ser. No. 551,472, filed Nov. 14, 1983, now U.S. Pat. No. 4,609,223, entitled SUNROOF CONTROLLER.

BACKGROUND OF THE INVENTION

The present invention relates to sunroofs for vehicles, and the like, and in particular to a controller arrangement therefor.

Sunroofs for vehicles, and other structures, have become increasingly popular. Generally, sunroofs comprise a circumambient frame, which defines an opening or window in the structure, and a retractable door or closure to selectively close the window.

In vehicles, the sunroof is normally located in the roof of the cab, and is either of the vent type, or of the slider type. Typical vent sunroofs have a window panel hinged to a frame member along the forward edge of the window panel. The rear edge of the window panel is raised and lowered by an adjustable prop or lever to respectively open and close the sunroof. Normally, vent sunroofs are an aftermarket accessory, and are installed after the vehicle is fully assembled.

Slider sunroofs have a closure or door that retracts either partially or wholly into the roof of the vehicle between the outer metal skin of the roof, and the interior headliner. Typically, slider sunroofs are original equipment accessories, and are installed when the vehicle is being assembled at the factory. Some slider sunroofs are equipped with a special mechanism, which permits the closure to be selectively pivoted in a vertical plane to also act as a vent.

Heretofore, closures for sunroofs have been controlled by either an electrical drive assembly with push-/pull cables, or a manual crank and cable arrangement. Both of these types of sunroof controllers have a rather complicated construction with multiple moving parts, and are relatively expensive to manufacture and install. The complexity of such mechanical assemblies requires periodic maintenance, and renders them inherently difficult to repair.

Also, those controllers that are designed for the slider type of sunroof have a construction which does not lend itself to aftermarket installation. Although some manually operated controllers for slider sunroofs are available, they are difficult to open and close, and encounter problems in creating a secure, weathertight seal. As a result, such structures sometimes allow moisture to enter the vehicle, and can cause unnecessary wind noise.

SUMMARY OF THE INVENTION

The present invention provides a controller for vehicle sunroofs, and the like, which incorporates at least one cam mechanism to shift a closure portion of the sunroof between various positions within a mating frame portion of the sunroof.

One aspect of the present controller contemplates a mechanism for releasably retaining the closure in an intermediate, partially open position. The mechanism includes at least one track operably connected with the frame, and extending generally along one side thereof in the direction of fore-to-aft closure translation. The track has upper and lower faces between which a track groove is defined. At least one cam mechanism is operably connected with the closure at the side thereof adjacent to the track. The cam mechanism includes a drive shaft, and an eccentric operably connected with the drive shaft and rotating therewith. The eccentric is received in the track groove, and has a transverse axis with a width smaller than the height of the track groove, and a longitudinal axis with a length at least substantially coextensive with the height of the track groove. A plurality of recesses are disposed in one of the faces of the track, and are shaped to receive therein an associated portion of the eccentric. A mechanism rotates the drive shaft axially between an unlocked position wherein the longitudinal axis of the eccentric is oriented substantially parallel with the longitudinal axis of the track to permit translation of the closure to a selected, partially open position, and a locked position wherein the longitudinal axis of the eccentric is oriented substantially perpendicular to the longitudinal axis of the track, and the associated portion of the eccentric is received in one of the recesses in the track. A releasable lock retains the drive shaft against axial rotation to positively hold the closure in the selected, partially open position.

Another aspect of the present invention contemplates a mechanism to raise the closure into a fully closed and locked position within the frame. At least one track is operably connected with the frame, and extends generally along one side of the frame in the direction of fore-to-aft closure translation. The track has upper and lower faces between which a track groove is defined. At least one cam mechanism is operably connected to the closure at a side thereof disposed adjacent to the track. The cam mechanism includes a drive shaft, and an eccentric operably connected with the drive shaft and rotating therewith. The eccentric is received in the track groove, and has a base at which the drive shaft is connected, a lobe, and opposite sides extending between the base and the lobe. A pocket is positioned at one end of the track, and includes a leading surface, and an eccentric support surface disposed at an elevation above the elevation of the lower face of that portion of the track at which the eccentric is located when the closure is in the unlocked, fully closed position. The eccentric support surface is shaped to abuttingly support the lobe portion of the eccentric thereon. A mechanism rotates the drive shaft axially between the unlocked, fully closed position wherein the eccentric is oriented generally horizontally in the track to permit translation of the closure toward the unlocked, fully open position, and the closed and locked position wherein one of the side portions of the eccentric abuts the leading surface of the pocket to simultaneously lift the closure upwardly and forwardly, and shift the eccentric into a generally vertical orientation, with a lobe of the eccentric on the eccentric support surface of the pocket to raise the closure into a sealing relationship with the frame.

Another aspect of the present invention contemplates a mechanism to securely retain the closure in the fully open position. At least one track is operably connected with the frame, and extends generally along one side of the frame in the direction of closure translation. The track has upper and lower faces between which a track groove is defined. The track has a rearward portion at which one of the upper and lower faces includes an arm extending rearwardly therefrom in a cantilevered fashion. The arm has a tab positioned adjacent a free end of the arm, and protrudes into the track groove. The arm is resiliently deformable to permit shifting of the tab toward and away from the track groove. At least one cam mechanism is operably connected with the closure at a side thereof disposed adjacent to the track. The cam mechanism includes a drive shaft, and an eccentric operably connected with the drive shaft and rotating therewith. The eccentric is received in the track groove, and has a transverse axis with a width smaller than the height of the track groove to permit fore-to-aft translation therebetween. The cam includes a base at which the drive shaft is connected, a lobe opposite the base, and a notch at a medial portion of the cam between the base and the lobe. The notch is shaped to selectively receive the tab therein to securely lock the closure in the fully open position. A mechanism rotates the drive shaft in a direction which causes the lobe to abut the arm adjacent the free end thereof to disengage the tab from the notch and unlock the closure from the fully opened position to permit translation of the closure toward the fully closed position.

Another aspect of the present invention contemplates the use of a cam mechanism to both raise the closure into the fully closed and sealed position, and retain the closure in an intermediate, partially open position, as well as to releasably lock the closure in the fully open position.

Another aspect of the present invention contemplates a different mechanism for releasably retaining the closure in an intermediate, partially open position. The mechanism includes at least one track operably connected with the frame, and extending generally along one side of the frame in the direction of fore-to-aft closure translation. The track includes a plurality of longitudinally spaced apart lock apertures, with central axis oriented mutually parallel, and generally transverse to the direction of closure translation. At least one lock mechanism is operably connected with the closure at the side thereof disposed adjacent to the track. The lock mechanism includes a lock pin having a longitudinal axis oriented substantially parallel with the lock apertures, and is shaped for close reception therein. A mechanism reciprocates the lock pin with respect to the track between an unlocked position wherein the lock pin is retracted and disengaged from the track to permit translation of the closure to a selected open position, and a locked position wherein the lock pin is extended and closely received in one of the lock apertures to positively retain the closure in the selected open position.

The principal objects of the present invention are to provide an uncomplicated controller arrangement for sunroofs, which is economical to manufacture, extremely reliable, and has a neat, factory-installed appearance. Preferably, the controller can be easily operated manually, even by those of limited strength and/or dexterity. At least one cam mechanism is provided to shift a closure portion of the sunroof within a mating frame. The sunroof has both slider and vent functions, and can be installed in aftermarket settings. The controller has only one major moving part, which can be used to raise the closure into a sealed position in the frame, releasably retain the closure in a partially open position, and/or releasably retain the closure in a fully open position. The uncomplicated nature of the controller provides reliability, reduces maintenance and costs, and facilitates repair, if necessary. The sunroof is efficient in use, economical, capable of a long operating life, and particularly well adapted for the proposed use.

These and other features, advantages and objects of the present invention will be further understood and appreciated by those skilled in the art by reference to the following written specification, claims and appended drawings.

BRIEF DESCRIPTION OF THE DRAWINGS

FIG. 2 is a generally longitudinal, fragmentary, cross-sectional view of the sunroof, showing a closure portion thereof in a closed and locked position, and a sunscreen portion thereof in a closed position.

FIG. 3 is a fragmentary cross-sectional view of the sunroof, similar to FIG. 2, wherein the sunscreen is shown in an open position.

FIG. 4 is a fragmentary cross-sectional view of the sunroof, similar to FIGS. 2 and 3, wherein the closure is shown in an upwardly pivoted, vent position.

FIG. 5 is a fragmentary, cross-sectional view of the sunroof, similar to FIGS. 2-4, wherein the closure is shown in a closed and unlocked position.

FIG. 6 is a fragmentary, cross-sectional view of the sunroof, similar to FIGS. 2-5, wherein the closure is shown in a partially open and unlocked position.

FIG. 7 is a fragmentary, cross-sectional view of the sunroof, similar to FIGS. 2-6, wherein the closure is shown in a partially open and locked position.

FIG. 8 is a fragmentary, cross-sectional view of the sunroof, similar to FIGS. 2-7, wherein the closure is shown in a fully attracted and locked position.

FIG. 9 is a partially schematic, fragmentary, side elevational view the sunroof, particularly showing the cam mechanism, wherein the closure is shown in the partially open and locked portion.

FIG. 10 is a partially schematic, fragmentary, lateral cross-sectional view of the sunroof, particularly showing the cam mechanism, wherein the closure is shown in the partially open and locked position.

FIG. 11 is a partially schematic, fragmentary side elevational view of the sunroof, particularly showing the cam mechanism, wherein the closure is shown in the partially open and unlocked position.

FIG. 12 is a partially schematic, fragmentary, lateral cross-sectional view of the sunroof, particularly showing the cam mechanism, wherein the closure is shown in the partially open and unlocked position.

FIG. 13 is a partially schematic, fragmentary, side elevational view of the sunroof, particularly showing the cam mechanism, wherein the closure is shown in the fully closed and locked portion.

FIG. 14 is a partially schematic, fragmentary, lateral cross-sectional view of the sunroof, particularly showing the cam mechanism, wherein the closure is shown in the fully closed and locked position.

FIG. 15 is an enlarged, partially schematic, fragmentary side elevational view of the sunroof, particularly showing the cam mechanism, in which the closure is in the fully closed position, and ready to be locked.

FIG. 16 is an enlarged, partially schematic, fragmentary side elevational view of the sunroof, particularly showing the cam mechanism, wherein the closure is shown in the fully closed and locked position.

FIG. 17 is an enlarged, partially schematic, fragmentary side elevational view of the sunroof, particularly showing the cam mechanism, wherein the closure is shown in the fully open and locked position.

FIG. 18 is a top plan view of a track portion of a second embodiment of the present invention.

FIG. 19 is a side elevational view of the track shown in FIG. 18.

FIG. 20 is a partially schematic, fragmentary, side elevational view of a cam mechanism portion of the second sunroof embodiment illustrated in FIGS. 18-19, wherein the closure is shown in the partially open and unlocked position.

FIG. 21 is a partially schematic, fragmentary, lateral cross-sectional view of the second sunroof embodiment, particularly showing the cam mechanism wherein the closure is shown in the partially open and unlocked position.

FIG. 22 is a partially schematic, fragmentary side elevational view of the second sunroof embodiment, particularly showing the cam mechanism, wherein the closure is shown in the partially open and locked position.

FIG. 23 is a partially schematic, fragmentary, lateral cross-sectional view of the second sunroof embodiment, particularly showing the cam mechanism, wherein the closure is shown in the partially open and locked position.

FIG. 24 is a partially schematic, fragmentary, side elevational view of the second sunroof embodiment, particularly showing the cam mechanism, wherein the closure is shown in the fully open and locked position.

FIG. 25 is a partially schematic, fragmentary, lateral cross-sectional view of the second sunroof embodiment, particularly showing the cam mechanism, wherein the closure is shown in the fully open and locked position.

FIG. 25A is a partially schematic, fragmentary, side elevational view of the second sunroof embodiment, particularly showing the cam mechanism, wherein the closure is shown in the fully closed position, but unlocked to permit forward transaction.

FIG. 26 is a partially schematic, fragmentary, side elevational view of the second sunroof embodiment, particularly showing the cam mechanism, wherein the closure is shown in the fully closed and unlocked position.

FIG. 27 is a partially schematic, fragmentary, lateral cross-sectional view of the second sunroof embodiment, particularly showing the cam mechanism, wherein the closure is shown in the fully closed and unlocked position.

FIG. 28 is a partially schematic, fragmentary, side elevational view of the second sunroof embodiment, particularly showing the cam mechanism, wherein the closure is shown in the fully closed and locked position.

FIG. 29 is a partially schematic, fragmentary, lateral cross-sectional view of the second sunroof embodiment, particularly showing the cam mechanism, wherein the closure is shown in the fully closed and locked position.

FIG. 30 is a top plan view of a latch portion of the second sunroof embodiment, shown in a locked position.

FIG. 31 is a front elevational view of the latch, shown in the locked position.

FIG. 32 is a bottom plan view of the latch, shown in the locked position.

FIG. 33 is a side elevational view of the latch, shown in the locked position.

FIG. 34 is a vertical cross-sectional view of the latch, taken along the line XXXIV—XXXIV, FIG. 30.

FIG. 35 is a vertical cross-sectional view of the latch, taken along the line XXXV—XXXV, FIG. 30.

FIG. 36 is a front elevational view of the latch, shown in an unlocked-position.

FIG. 37 is a vertical cross-sectional view of the latch, taken along the line XXXVII—XXXVII, FIG. 36.

FIG. 38 is a vertical cross-sectional view of the latch, shown assembled in the second sunroof, and with the latch in the locked position.

FIG. 41 is a generally longitudinal, fragmentary, cross-sectional view of the third sunroof embodiment, wherein the closure is shown in the partially open and locked position.

FIG. 42 a partially schematic, fragmentary side elevational view of the third sunroof embodiment, particularly showing a modified cam mechanism, wherein the closure is shown in the fully closed and locked position.

FIG. 43 is a fragmentary, bottom plan view of an actuator portion of The cam mechanism illustrated in FIG. 42, wherein the closure is shown in a locked position.

FIG. 44 is a partially schematic, fragmentary, lateral cross-sectional view of the cam mechanism illustrated in FIG. 42, wherein the closure is shown in the partially open, locked position.

FIG. 45 is a bottom plan view of the actuator illustrated in FIG. 43, wherein the closure is shown in an unlocked position.

FIG. 46 is a partially schematic, fragmentary, lateral cross-sectional view of the cam mechanism illustrated in FIG. 44, wherein the closure is shown in the partially open and unlocked position.

FIG. 47 is an end elevational view of the actuator illustrated in FIGS. 43 and 45, wherein the closure is shown in the locked position.

FIG. 48 is a partially schematic, fragmentary, lateral cross-sectional view of the cam mechanism illustrated in FIG. 42, wherein the closure is shown in the fully closed and locked position.

DETAILED DESCRIPTION OF THE PREFERRED EMBODIMENTS

Figure 1B:
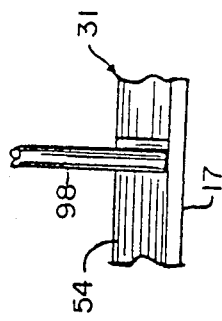
FIG. 1B is a fragmentary plan view of a rearward, broken-away portion of the sunroof, particularly showing a rear slide portion thereof.

For purposes of description herein, the terms "upper," "lower," "right," "left," "rear," "front," "vertical," "horizontal," and derivatives thereof shall relate to the invention as oriented in FIGS. 2, 19 and 41. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions, and other physical characteristics relating to the embodiments disclosed herein, are not to be considered as limiting, unless the claims by their language expressly state otherwise.

The present application discloses three different embodiments of my invention. FIGS. 1-17 illustrate a first embodiment of my invention, FIGS. 18-38 illustrate a second embodiment of my invention, and FIGS. 39-48 illustrate a third embodiment of my invention. Since the second and third embodiments of my invention are generally similar to the first embodiment of my invention, similar parts appearing in FIGS. 1-17, 18-38 and 39-48 respectively are represented by the same, corresponding reference numeral, except for the suffix "a" in the numerals of the second embodiment of my invention (FIGS. 18-38), and the suffix "b" in the numerals of the third embodiment of my invention (FIGS. 39-48).

First Embodiment (FIGS. 1-17)

The reference numeral 1 (FIG. 1) generally designates a controller 1 for sunroofs 2. The illustrated sunroof 2 is particularly adapted for vehicles, and the like, and is of the type having a main frame 3 defining a window or opening 4 (FIG. 4), and a retractable closure 5 to selectively open and close opening 4. Controller 1 comprises left and right-hand tracks 6 (FIG. 1) operably connected with main frame 3 along opposite sides of closure 5. Guides 7 project laterally outwardly from the sides of closure 5, and are matingly received in associated portions of tracks 6 to slidingly support the closure for fore-to-aft translation between fully open and fully closed positions. A seal 8 (FIG. 2) is positioned between closure 5 and main frame 3 to form a weathertight seal therebetween when the closure is in the fully closed and locked position. In the illustrated structure, controller 1 includes two cam mechanisms 9 and 10, each of which comprises an eccentric 11 and a drive shaft 12 interconnected for axial rotation together. Each eccentric 11 is positioned in an associated portion of one of the tracks 6, and is shaped so that rotation of the eccentric 11 raises and lowers at least an associated portion of closure 5 in main frame 3. When cam mechanisms 9 and 10 are rotated to the fully closed and locked position shown in FIGS. 13 and 14, closure 5 is raised into abutting, compressive contact with seal 8 to sealingly close the window opening 4. When cam mechanisms 9 and 10 are rotated into the unlocked position shown in FIGS. 11 and 12, closure 5 is lowered out of abutting contact with seal 8 to permit closure 5 to slide freely in a fore-to-aft direction.

Figure 1A:
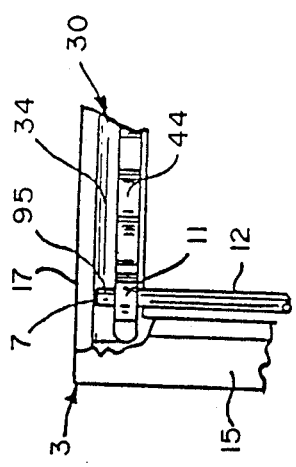
FIG. 1A is a fragmentary plan view of a forward, broken-away corner of the sunroof, particularly showing a cam mechanism portion thereof.
Figure 1:
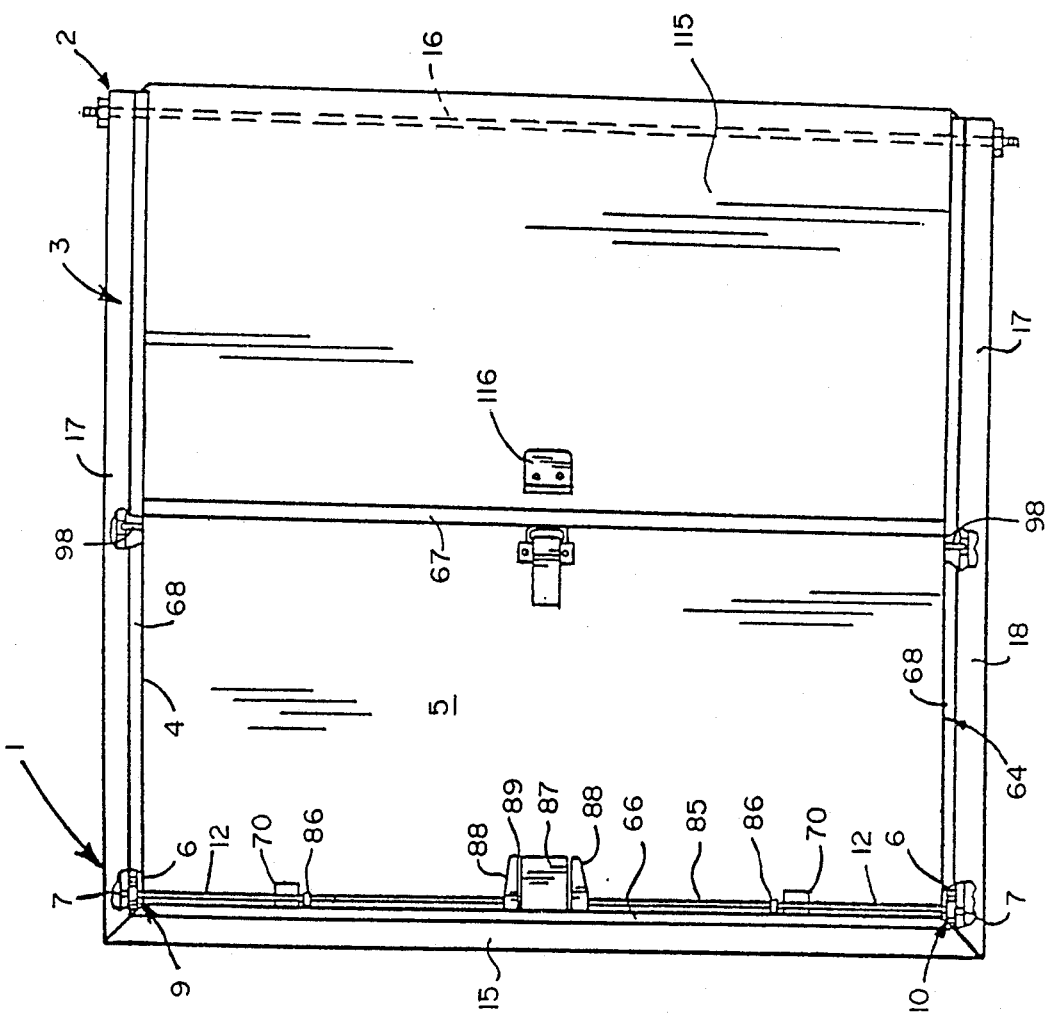
FIG. 1 is a bottom plan view of a sunroof embodying the present invention, wherein portions thereof have been broken away to reveal internal construction.
Figure 40:
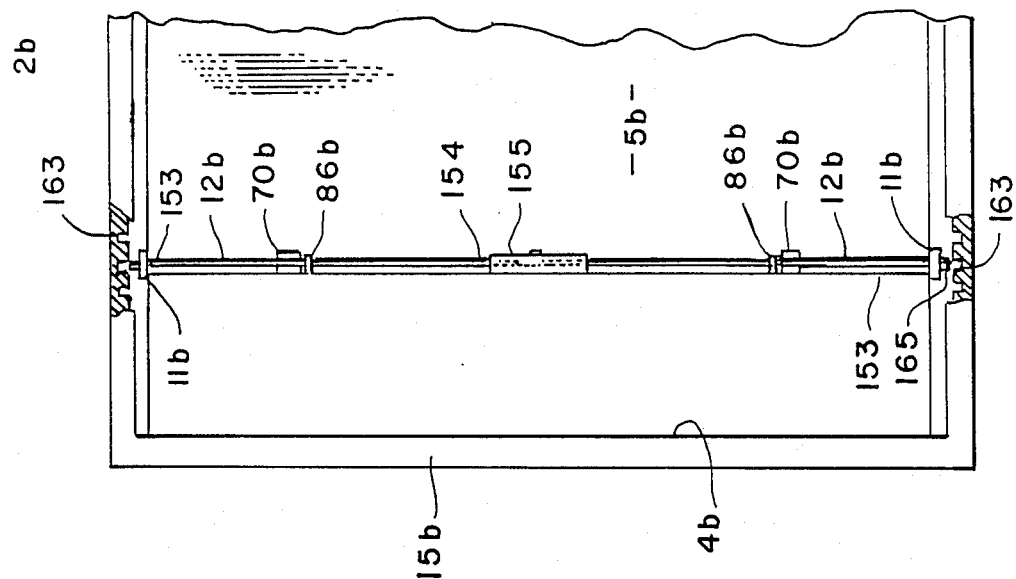
FIG. 40 is a bottom plan view of the third sunroof embodiment, wherein the closure is shown in the partially open and unlocked position.
Figure 39:
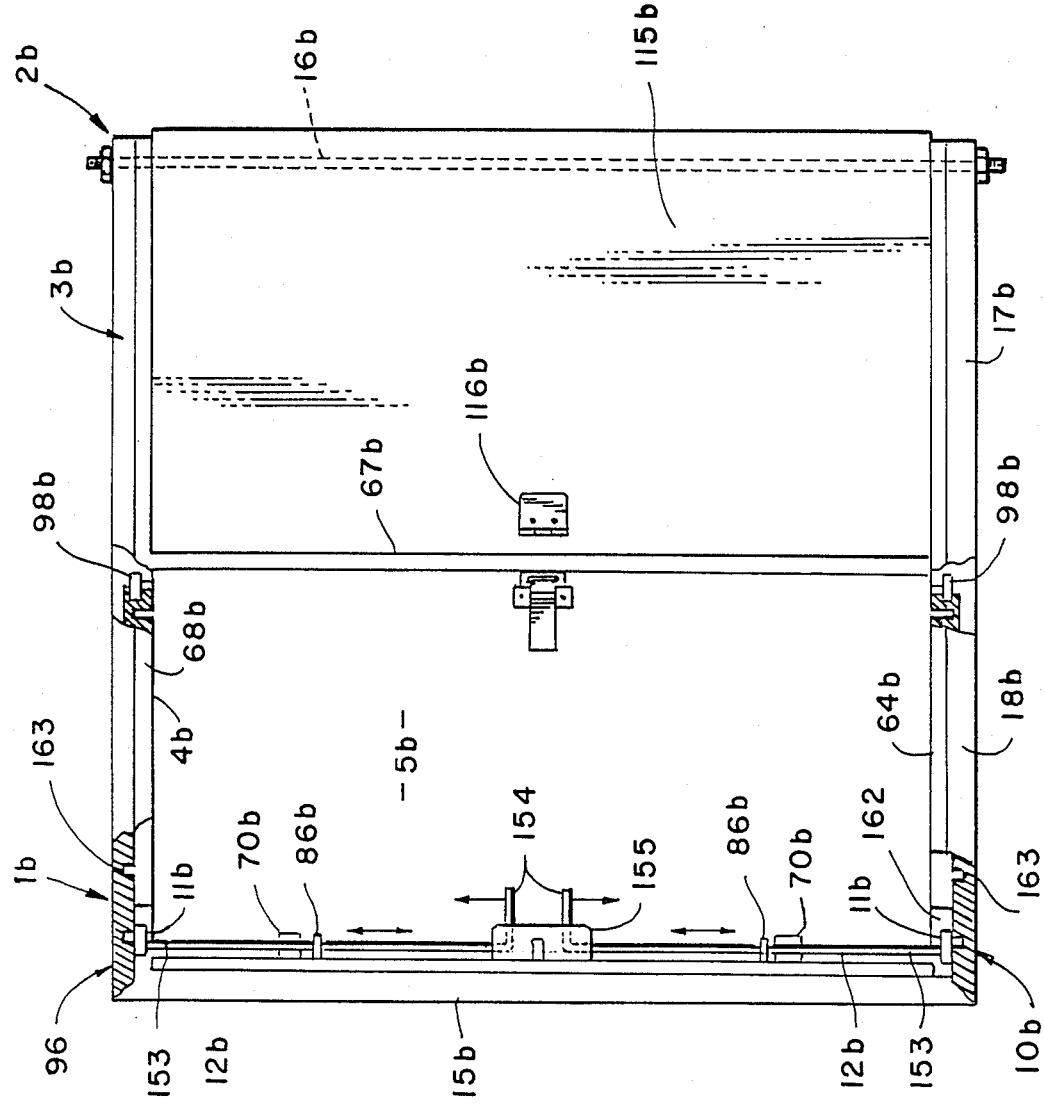
FIG. 39 is a bottom plan view of a third embodiment of the present invention, wherein the closure is shown in the fully closed and locked position.

With reference to FIG. 1, main frame 3 is a rigid structure, having a substantially rectangular plan configuration. The illustrated main frame 3 includes a front leg 15, a rear leg 16 and opposite side legs 17, which are interconnected to define window opening 4. As best illustrated in FIG. 3, each frame leg 15-17 comprises a section of extruded, C-shaped channel, having a web 18, and upper and lower flanges 19 and 20. Lower flange 20 includes an upturned lip 21, and a U-shaped groove 22 for purposes to be described in greater detail hereinafter. When sunroof 2 is installed in a vehicle (not shown), it is adapted to fit between the outer, sheet metal skin of the vehicle roof 23, and the interior headliner 24 of the vehicle. Main frame 3 has a length that is over twice the length of closure 5, and thereby forms a cavity in the vehicle roof into which closure 5 can be fully retracted.

With reference to FIGS. 8-14, tracks 6 are mounted on the interior faces of main frame side legs 17. In the illustrated example, tracks 6 include a pair of forward tracks 30, and a separate pair of rearward tracks 31, which are arranged in frame side legs 17 in an end-to-end relationship. Both pairs of tracks 30 and 31 are preferably constructed of a self-lubricating material, such as nylon, or other similar synthetic materials.

Each forward track 30 (FIGS. 8-14) has a longitudinally extending cavity or groove, which includes a track channel 34 disposed between upper and lower surfaces 35 and 36 respectively longitudinally along a track web 50. Each track channel 34 is located centrally between the vehicle roof 23 and headliner 24, and is generally parallel therewith. The forward end 37 (FIG. 13) of each track channel 34 is inclined upwardly, and communicates with an enlarged pocket 38. The rearward end 41 (FIG. 17) of each track channel 34 includes a resilient tab 42, which is designed to form a snap-lock with an associated one of the eccentrics 11 to retain closure 5 in the fully open position, as described in greater detail hereinafter. Tabs 42 protrude downwardly from the upper surfaces 35 of track channels 34. In this example, tabs 42 have a generally triangular configuration, and are molded integrally with tracks 30.

The longitudinally extending cavity area in each forward track 30 (FIGS. 8-14) also includes a track groove 44 located adjacent track channel 34, and below the lower surface 36 of track channel 34. The forward end of each track groove 44 also communicates with an associated one of the pockets 38, and has an arcuately shaped, eccentric support pad or surface 39 on which an associated one of the eccentrics 11 is supported when closure 5 is in the fully closed and locked position. Each support pad 39 has a generally arcuate configuration, and is recessed slightly below the lower surface 36 of track channel 34, as well as a leading surface, or an aft lip portion 40 of the pocket. The uppermost surface of lip 40 is located slightly below the lower surface 36 of track channel 34.

The lower surface of each track groove 44 has a non-planar, scalloped construction, which in the illustrated example, includes a plurality of side-by-side indentations or recesses 46 that are arcuately shaped to mate with eccentrics 11, as described below. Each recess 46 has a base surface 45, with sidewalls extending upwardly therefrom on opposite sides to peak surfaces 47. The illustrated recesses 46 have an arcuate measure of approximately 120 degrees, and are centered vertically. The rearward end 41 (FIG. 17) of each track groove 44 includes an upwardly inclined ramp 48 that leads to a generally horizontal support surface 49 on which an associated one of the cam eccentrics 11 is supported when closure 5 is retracted into the fully open position. Track support surface 49 is positioned slightly below the lower surface 36 of track channel 34, so that eccentrics 11 are rotated into a generally horizontal, unlocked orientation when closure 5 is moved into the retracted, fully open position. Each forward track 30 has an integrally formed, channel-shaped body, comprising a vertically oriented web 50, and upper and lower flanges 51 and 52 respectively.

Each of the rear tracks 31 (FIGS. 15-17) also includes a longitudinally extending track channel 54. The forward end 55 (FIGS. 15 and 16) of each rear track channel 54 is inclined upwardly to a raised plateau 56, which has a semi-circularly shaped terminal or forward surface. The rearward end 57 (FIG. 17) of each rear track channel 54 is generally colinear with the longitudinal axis of channel 54, and has a semi-circular terminal or rear surface 58.

With reference to FIGS. 2-4, the illustrated closure 5 comprises a rectangular armature or window frame 64 in which a transparent panel or pane 65 is pivotally mounted along its forward edge. Window frame 64 is a rigid structure, comprising a front leg 66, a rear leg 67 and opposite side legs 68. Preferably, transparent panel 65 is constructed of a very durable, shatterproof material, such as glass or plastic, and may be tinted or coated to reduce heat transfer into the cab of the vehicle. A pair of flexible, one-piece hinges 70 (FIG. 4) have opposite flanges attached to the front leg 66 of window frame 64, and the forward edge of transparent panel 65, so that the transparent panel pivots or tilts about its forward edge with respect to window frame 64 to provide a venting function. A seal 71 extends about the interior marginal edge of window frame 64, on the upper surface thereof, and abuts with the marginal edge of transparent panel 65 to form a weathertight seal between transparent panel 65 and window frame 64.

An adjustable prop 72 (FIGS. 2-4) is provided at the rear edge of transparent panel 65 at a laterally central portion thereof. Prop 72 includes an arm 73 having one end thereof pivotally attached to the rearward edge of transparent panel 65 by a clevis bracket 74. Arm 73 is generally L-shaped, with an arcuate elbow 75, and notches 76 and 77. A latch bracket 78 is attached to the rearward leg 67 of window frame 64, in alignment with prop arm 73, and includes a transversely extending support pin 79. When window panel 65 is pivoted upwardly for venting, it is retained in one of two selected positions by engaging either the medial notch 76 or the end notch 77 of prop arm 73 with the support pin 79 of bracket 78. It is to be understood that prop arm 73 may be provided with additional notches or other intermediate retainer mechanisms to hold window panel 65 open at additional tilt positions.

To close window panel 65, the notched portion 76 or 77 of prop arm 73 is disengaged from support pin 79, and the prop arm is slid downwardly between support pin 79 and the rear leg 67 of window frame 64. The window panel 65 is locked sealingly in the mating window frame 64 by rotating prop arm 73 forwardly, such that the elbow portion 75 of prop arm 73 engages support pin 79, thereby forming an over-centered lock that draws the window panel down securely against seal 71.

The illustrated window frame 64 is slidingly supported in the sunroof frame 3 in the following manner. A drive or control shaft 85 (FIG. 1) is pivotally mounted on the front leg 66 of window frame 64 by a pair of nylon bearing blocks 86. In this example, control shaft 85 is a rigid, cylindrically-shaped rod. A handle-shaped lever 87 is fixedly attached to the central portion of control shaft 85, and rotates therewith. A pair of retainer brackets 88 are fixedly attached to the front leg 66 of window frame 64, and protrude rearwardly along the opposite sides of control handle 87. The free end of each retainer bracket 88 includes a hemispherically-shaped knob 89 (FIGS. 1 and 6) protruding outwardly from the interior surface thereof. Knobs 89 are constructed of a resilient, self-lubricating material, such as nylon or the like, and are preferably molded integrally with retainer brackets 88. Knobs 89 are configured to mate with similarly shaped dimples or recesses 90 in the opposite side faces of control handle 87 to form a snaplock therebetween.

The outer ends of control shaft 85 (FIG. 1) define drive shafts 12, and also extend through the side legs 68 of window frame 64 to form guides 7. The outermost terminal free ends of drive shafts 85 are, in this example, cylindrical in shape with smooth exterior surfaces that define bearing 95 (FIG. 1A), that are closely received in mating track channels 34. Eccentrics 11 are fixedly attached to drive shafts 12, at locations thereon disposed inwardly of the associated bearings 95, such that bearings 95 may in effect function as outward extensions of eccentric 11. Eccentrics 11 are disposed in the associated track grooves 44 of tracks 30, as described in greater detail hereinafter.

A pair of slides 98 (FIGS. 1 and 1B) support the rearward edge of window frame 64 in sunroof frame 3. The illustrated slides 98 are cylindrically shaped pins that are rigidly attached to the side legs 68 of the window frame 64 at a location adjacent to rear frame leg 67, and protrude laterally outwardly therefrom. The outer ends of slides 98 are smooth, and closely received in the track channels 54 of rear tracks 31. Hence, the illustrated window frame 64 is slidingly supported in tracks 30 and 31 by bearings 95 at the forward edge, and slides 98 at the rearward edge, thereby providing smooth, fore-to-aft movement of closure 5 in main frame 3. Roller sleeves (not shown) may be rotatably mounted on slides 98 to facilitate translation along tracks 31.

Closure 5 is retained in lateral alignment within main frame 3 by abutment between the side legs 68 (FIG. 10) of window frame 64, and the interior side faces 99 of tracks 30 and 31. Preferably, the rear leg 16 of main frame 3 comprises a rod, having its ends threadedly connected with the main frame side legs 17, such that the lateral clearance between the sides 68 of window frame 64 and tracks 30 and 31 can be adjusted to avoid binding.

With reference to FIGS. 9-15, eccentrics 11 have a generally oblong shape, with oppositely oriented base and lobe portions 100 and 101. The illustrated eccentrics 11 have a somewhat elliptical plan shape, wherein the base and lobe portions 100 and 101 each have a semi-circular, smooth marginal edge 102. The opposite side edges 103 of eccentrics 11 are generally flat, and include rectangular notches or indentations 104. Control shaft 85 extends concentrically through the base portions 100 of each of the eccentrics 11. The lobe portions 101 of eccentrics 11 are substantially commensurate in size and shape with the recesses 46 in the scalloped channel bases 45. In this example, eccentrics 11 are constructed from an extruded bar of aluminum.

Eccentrics 11 have a preselected size with respect to the cavity disposed between the scalloped base surfaces 45, peak surfaces 47, and the upper surfaces 35 of track channels 34. Initially, the spaces between the scalloped bases 45 and the adjacent upper channel surfaces 35 are substantially uniform along their length. The width along the transverse axis of each eccentric 11 is less than the peak height of the associated track space, as measured between peak surfaces 47, and upper channel surfaces 35. The length of each eccentric 11 is larger than the peak height of the associated track space, such that eccentrics 11 can be shifted between the locked and unlocked positions, as illustrated in FIGS. 9-12.

As best illustrated in FIGS. 9-12, the diameter of bearings 95 is slightly less than the width of the mating track channels 34 in which they are received. When closure 5 is unlocked, handle 87 points downwardly, as illustrated in FIG. 12, and eccentrics 11 assume a substantially horizontal orientation, with lobes 101 disposed above, and wholly disengaged from any portion of the scalloped channel bases 45. In this manner, bearings 95 rest on the lower channel surfaces 36, and slidingly support window frame 64 thereon for fore-to-aft translation. To lock closure 5 in a partially open position, the operator grasps control handle 87, and rotates the same rearwardly into a substantially horizontal orientation, as shown in FIGS. 9 and 10. This motion rotates eccentrics 11, such that the lobe portions 101 of eccentrics 11 engage a pair of associated recesses 46 in the scalloped channel bases 45, and lift window frame 64 upwardly until bearings 95 abut upper channel surfaces 35, as shown in FIGS. 9 and 10. As control handle 87 reaches the fully horizontal position, it is retained in place with a snap-lock action between bracket knobs 89 and handle dimples 90. With eccentrics 11 in the locked, substantially vertical orientation (FIGS. 9 and 10), window frame 64 cannot be moved forwardly or rearwardly unless eccentrics 11 are disengaged from the scalloped channel base 45 by rotating control handle 87 into the unlocked position.

When window frame 64 is moved to the fully retracted position shown in FIG. 17, the downwardly projecting, resilient tabs 42 engage the leading edge of base portions 101 on eccentrics 11, and are flattened or deformed slightly until they snap into the upper notches 104 to form a lock. The tab includes a leading edge, a trailing edge and an engagement edge disposed therebetween which is closely received in said notch. This snap-lock selectively retains window frame 64 in the fully retracted position.

To close closure 5, cam eccentrics 11 are unlocked, and window frame 64 is pulled all the way forwardly to the fully closed, unlocked position shown in FIG. 5. When window frame 64 is fully forward, the marginal edges 102 of the eccentric bases 100 engage the pocket lips 40, as illustrated in FIG. 15. Control handle 87 is then rotated to the fully closed and locked position, thereby pivoting eccentrics 11 into pockets 38, and simultaneously pulling window frame 64 upwardly and forwardly until eccentrics 11 assume a substantially vertical orientation in the mating track pockets 38, as shown in FIG. 16. This lifting action draws the forward portion of window frame 64 securely against mating seal 8. The track channels 34 have upwardly inclined forward ends which extend into pockets 38, such that when eccentrics 11 are rotated into the locked position (FIG. 16), bearings 95 do not engage the upper surfaces of track channels 34, thereby insuring maximum sealing contact between closure 23 and seal 8. Pockets 38 are shaped to closely receive eccentrics 11 therein to positively prevent closure 23 from opening without first rotating eccentrics 11 out of the locked position. Eccentrics 11 can be oriented on control rod 85, such that they assume a forwardly over-centered, locked position in pockets 38 when handle 87 is horizontal.

As the forward edge of window frame 64 is pulled forwardly and raised into the locked position, the rearward edge of the window frame is similarly lifted to obtain uniform compressive force on seal 8. Slides 98 engage the upwardly inclined portions 55 of the rear tracks 31. As eccentrics 11 pull window frame 64 upwardly and forwardly, engagement between slides 98 and inclined track ramps 55 lifts the rear edge of window frame 64, until each slide is resting upon the raised track plateau 56.

In the illustrated structure, sunroof 2 includes a sunscreen 115 (FIGS. 2-4), slidably mounted in the lower, C-shaped slot 22 of frame 3. Sunscreen 115 comprises a rigid panel of tinted or opaque material. A handle 116 is attached to and depends from a forward edge of sunscreen 115 to facilitate movement. Sunscreen 115 is manually translated between the closed position illustrated in FIG. 2, and the open position shown in FIG. 3.

In operation, either the driver of the vehicle, or a passenger, manually manipulates sunroof 2. Sunscreen 115 is first opened by grasping handle 116, and pulling rearwardly (FIG. 2). Next, the user reaches overhead, and grasps handle 87. To retract closure 5, the user pivots handle 87 downwardly (FIG. 5), and pulls the closure to the rear (FIG. 6) until the desired position is reached. If closure 5 is retracted into the fully open position (FIG. 8), handle 87 will remain in the unlocked vertical orientation, and snap-lock tabs 42 will hold closure 5 fully open. If the user has selected an intermediate, partially open position (FIG. 6), closure 5 is locked in place by simply pivoting handle 87 upwardly into the horizontal, locked position (FIG. 7).

To pivot window panel 65 upwardly for venting, window frame 64 is first closed and locked. The user then grasps the free end of prop lever 73 and pulls downwardly to release the over-centered latch. Prop lever 73 then is pivoted into a substantially vertical orientation, and pushed upwardly until the desired tilt position is obtained. Next, prop lever 73 is pivoted forwardly slightly to engage support pin 79 with one of the mating prop notches 76 and 77 (FIG. 4). Window panel 65 is closed (FIGS. 2 and 3) by simply reversing the steps outlined above.

The manually operated cam eccentric and guide arrangement of the present sunroof construction is a very uncomplicated construction which is economical, durable, easy to operate, and capable of forming a very secure, weathertight seal between the closure 5 and the vehicle roof 23. The two-way movement of the closure 5 is achieved with only one major moving part. The scalloped channel bases 45, when mated with the cam eccentrics 9, securely locks the closure 5 in any one of a wide variety of intermediate, partially open positions. The sliding window frame 64 and pivotally mounted window panel 65 arrangement provide both vent and slider functions, with a sufficiently uncomplicated construction that it can be installed in aftermarket environments, yet have a neat, factory-installed appearance.

Second Embodiment (FIGS. 18-38)

The reference numeral 1a (FIGS. 18-38) designates a second embodiment of the present invention, having certain modifications to forward tracks 30a, eccentrics 11a, and handle 87a, as specified below. As previously noted, since sunroof 1a is similar to the previously described sunroof 1, similar parts appearing in FIGS. 1-17 and 18-38 respectively are represented by the same, corresponding reference numeral, except for the suffix "a" in numerals of the latter.

With reference to FIGS. 18-23, the forward tracks 30a of sunroof 2a each have a differently configured vertical cross-sectional shape, particularly with respect to track groove 33a and track channel 34a, which permits the associate eccentric 11a to be received wholly within the longitudinal cavity of track 30a. More specifically, as best shown in FIGS. 21 and 23, the interior side edge of the upper track flange 51a is vertically aligned with the interior side edge of the lower track flange 52a. Hence, track groove 33a is disposed between the inner half of surface 35a on upper track flanges 51a, and base surfaces 45a on the lower track flange 52a. Track channel 34a is disposed between the outer half of surface 35 on upper track flange 51a and track surface 36a. As a result, the eccentrics 11a of sunroof 2a cooperate with associated forward tracks 30a in a manner slightly different than the previously described sunroof 2, as will be discussed in greater detail hereinafter.

With reference to FIGS. 20 and 22, eccentrics 11a are substantially identical, and each has a tapered side elevational shape, which include a semi-circular base 100a, and a semi-circular lobe 101a, having a diameter slightly smaller than that of base 100a. The opposite sides 103a of eccentric 11a are generally planar, and taper inwardly from base 100a to lobe 101a. Each eccentric 11a has only one notch 104a, which is formed in the forward one of the eccentric sides 103, and has a generally rectangular lateral cross-sectional shape.

In a manner similar to previously described sunroof 2, the eccentrics 11a of sunroof 2a are fixedly attached to drive shafts 12a, and are positioned at locations spaced slightly inwardly from the terminal ends of drive shafts 12a, so as to form bearings 95a. Bearings 95a are received in track channels 34a, and slidingly support closure 5a in main frame 3a for fore-to-aft translation. Eccentrics 11a each have a transverse axis with a width measured therealong which is smaller than the peak height of the associated track groove 33a, as measured perpendicular between surface 35a of upper track flange 51a, and the peak surfaces 47a of recesses 46a in lower track flange 52a. Eccentrics 11a each have a longitudinal axis with a length measured therealong which is at least greater than the peak height of the associated track groove 33a to achieve a locking action with recesses 46a. Preferably, the length of each eccentric 11a is substantially coextensive, or even slightly greater than the base height of the associated track groove 33a, as measured perpendicular between surface 35a of upper track flange 51a, and the base surfaces 45a of recesses 46a in lower track flange 52a for those reasons discussed below.

Eccentrics 11a are mounted on drive shafts 12a, such that when handle 87a is oriented generally vertically, eccentrics 11a are in the unlocked position (FIGS. 20 and 21), with their longitudinal axes disposed substantially parallel with the longitudinal axes of track channels 34a. The upwardly facing one of the eccentric sides 103 is spaced apart from the upper surface 35a of track channel 34a to permit free longitudinal translation of eccentrics 11a in forward tracks 30a. When handle 87a is oriented generally horizontally, eccentrics 11a are in the locked position (FIGS. 22 and 23), with the longitudinal axes of eccentrics 11a disposed substantially perpendicular to the longitudinal axes of track channels 34a. The lobe 101a of each eccentric 11a is received in an associate one of base recesses 46a, and the base 100a of each eccentric 11a is preferably disposed immediately adjacent to the upper surface 35a of track groove 33a. In this configuration, closure 5a is locked in an intermediate, or partially open position, and cannot be translated with respect to main frame 3, until eccentrics 11a are rotated out of engagement with track surfaces 35a and 45a, and into the unlocked position shown in FIGS. 20 and 21. In contrast to previously described sunroof 2, bearings 95a of sunroof 2a do not engage either the upper surface 35a or the lower surface 36a of track groove 33a when closure 5a is in the partially open, locked position.

As will be apparent to one having ordinary skill in the art, the present invention contemplates that the length of each of the eccentrics 11a may be smaller than the base height of the associated track groove 33a, so long as the eccentric length is greater than the peak height of track groove 33a, and sufficient to remain engaged in one of the track recesses 46a, to retain closure 5a locked in the selected, partially open position. When the length of eccentrics 11a is selected slightly larger than the base height of track grooves 33a, eccentrics 11a will lock in track grooves 33a with a wedging type of action that not only provides a secure lock, but also alleviates rattles.

With reference to FIGS. 18–19 and 24–25, the rearward ends 41a of forward tracks 30a include snap-locks for releasably retaining closure 5a in the fully retracted or open position. The upper flanges 51a of tracks 30a extend rearwardly in a cantilevered fashion to form resilient arms 121 at the rearward ends 41a of tracks 30a. Tabs 42a are formed integrally at the ends of arms 121, and protrude inwardly toward track channels 34a. Tabs 42a each include a flat trailing edge 122, an arcuate leading edge 123, and an abutment edge 124 disposed therebetween shaped to abuttingly mate with lobe 101a of eccentric 11a. Abutment edge 124 is shaped to be received in an associated one of the notches 104a in eccentrics 11a. In the illustrated example, resilient arms 121 are formed by cutting or otherwise forming a window 125 in each web 50a of tracks 30a directly below the upper flanges 51a, such that arms 121 extend directly rearwardly in a cantilevered fashion.

In operation, with eccentrics 11a in the unlocked position (FIGS. 20 and 21), and handle 87a oriented generally vertically, as closure 5a is retracted rearwardly toward the fully retracted or open position, the bases 100a of eccentrics 11a abuttingly engage tabs 42a, and resiliently flex arms 121 upwardly from their normal position. Continued rearward translation of closure 5a causes tabs 42a to snap into the notches 104a of eccentrics 11a so as to securely retain closure 5a locked in the fully open position. To disengage tabs 42a from eccentric notches 104a, handle 87a is rotated forwardly beyond the unlocked position, which in turn rotates drive shafts 12a in a clockwise direction, as viewed in FIGS. 24 and 25A. The lobes 101a of eccentrics 11a thereby abut the curved leading edges 123 of arms 121, and lift tabs 42a out from eccentric notches 104a to an elevation where in tab abutment edges 124 are disposed above the trailing edge of notches 104a, as shown in FIG. 25A. When tabs 42a have been disengaged from eccentric notches 104a, closure 5a may be freely translated forwardly from the fully open position toward the fully closed position.

With reference to FIGS. 26 and 28, the forward ends of both track grooves 33a and track channels 34a are inclined upwardly to facilitate shifting closure 5a into the fully closed and locked position. The inclined surface 127 of track grooves 33a help to guide eccentrics 11a into the generally horizontal, unlocked position as closure 5a is translated toward the fully closed position. The forward ends of track channels 34a are shaped so that bearings 95a do not abut the walls of pockets 38a as closure 5a is shifted into the fully closed and locked position. The forward end walls of track pockets 38a are inclined forwardly past vertical, so that eccentrics 11a assume an over-centered position when closure 5a is in the fully closed and locked position.

With reference to FIGS. 30–38, rotation of drive shafts 12a is achieved by a latch assembly 130. Latch assembly 130 comprises a base 131 fixedly mounted to the front leg 66a of window frame 64a, at a medial portion thereof. Base 131 includes opposite sides 132 with transversely extending apertures 133 in which the inward ends of drive shafts 12a are received and rotatably supported. In the illustrated example, a single drive shaft 85a, in the form of a cylindrical rod, extends laterally across the entire width of window frame 64a. However, it is to be understood that two or more shafts interconnected at some convenient point could also be used. Latch base 131 also includes a front wall 134 connected with and extending between sidewalls 132. A latch 135 is mounted in latch base 131, and in the illustrated example, comprises a flexible plate, having opposite ends thereof attached to base sidewalls 132. Latch plate 135 is resiliently flexible at its center in a fore-to-aft direction, and includes an integrally formed hook 136 at the upper edge thereof, having a leading edge 137. The exterior surface 138 of hook 136 is arcuately shaped, and is serrated or otherwise roughened to facilitate manually flexing latch 135 rearwardly toward the unlocked position. Latch assembly 130 also includes a handle 87a, which is operably connected with drive shaft 85a for rotation therewith. In the illustrated example, handle 87a comprises a plate-shaped body 141 having an arcuately shaped free end 142, and a rectangularly shaped aperture or window 143 disposed in the central portion of handle body 141. A sleeve portion 144 of body 141 is received over the central portion of drive shaft 85a, and is rigidly attached thereto by means such as the illustrated pin 145. Handle 87a is oriented on drive shaft 85a, such that when eccentrics 11a are in the unlocked position, handle 87a is oriented substantially vertically, as illustrated in FIGS. 36 and 37, and when eccentrics 11a are in the locked position, handle 87a is oriented substantially horizontally, as illustrated in FIGS. 31 and 35. A pair of springs 146 (FIG. 30), have opposite ends connected with latch base 131 and latch handle 87a, and resiliently urge latch handle 87a toward the locked position.

In operation, as handle 87a is rotated from the unlocked position (FIG. 37) to the locked position (FIG. 35), the interior surface of handle body 141 abuttingly engages the forward portion of arcuate latch surface 138, and flexes latch plate 135 rearwardly to permit hook 136 to pass through the window 143 in handle body 141. As soon as the edge 137 of hook 136 clears window 143, latch 135 moves forwardly to position hook edge 137 against the forward edge 146 of handle window 143 to positively capture handle 87a in the locked position. Latch assembly 130 thereby positively prevents eccentrics 11a from rotating out of the locked position, until latch assembly 130 is released. To unlock latch assembly 130, the user simply pushes rearwardly on latch surface 138, flexing latch plate 135 rearwardly to disengage hook edge 137 from the corresponding edge 147 of handle window 143. Handle 87a is then grasped at curved end 142, and rotated downwardly (in a clockwise direction as viewed in FIG. 37) to the unlocked position.

Third Embodiment (FIGS. 39–48)

The reference numeral 1b (FIGS. 39-48) designates a third embodiment of the present invention, having certain modifications to forward tracks 30b, eccentrics 11b, and handle 87b, as specified below. As previously noted, since sunroof 2b is similar to the previously described sunroofs 2, similar parts appearing in FIGS. 1-17 and 39-48 are represented by the same, corresponding reference numeral, except for the suffix "b" in the numerals of the latter.

With reference to FIGS. 41-48, the eccentrics 11b of sunroof 2b comprise circularly shaped discs or wheels. Two separate drive shafts 12b are provided on opposite sides of sunroof 2b, and are mounted in window frame 64b for both axial rotation and lateral translation, as described in greater detail hereinafter. The outer end 153 of each of the drive shafts 12b is attached to an associated one of the wheels 11b at a location eccentric to the central axis of the wheel 11b. The inner end 154 of each of the drive shafts 12b is L-shaped, and is received in an associated bracket 155. As best illustrated in FIGS. 43, 45 and 47, bracket 155 has a U-shaped transverse cross-sectional configuration, and receives the inner ends 154 of drive shafts 12b between opposite flanges 156. A pair of pins 157 extend through the flanges 156 of bracket 155 at opposite ends thereof, and prevent drive shafts 12b from sliding laterally out from the ends of bracket 155. A spring 158 is positioned between the inner ends 154 of drive shafts 12b, and biases the same outwardly into a normally locked position, as illustrated in FIGS. 43 and 47. Bearing blocks 86b mount drive shafts 12b on window frame 64b, and permit both axial rotation and lateral translation of drive shafts 12, as discussed in greater detail below.

The forward tracks 30b of sunroof 2b include webs 50b, and lower flanges 52b, which extend inwardly from the lower end of webs 50b. The upper surfaces 160 of flanges 52b defines tracks to slidingly support window frame 64b on main frame 3b, in the manner described hereinafter. As best illustrated in FIG. 41, the forward ends 37b of tracks 30b include elevated support surfaces 39b, with downwardly inclined ramp surfaces 162 extending therefrom to the upper surfaces 160 of flanges 52b. The webs 50b of forward tracks 30b include a plurality of lock apertures 163 in the interior surface thereof, which are spaced apart in a regular pattern along the length of track 30b. Lock apertures 163 are spaced above the upper surface 160 of flange 52b a predetermined distance, and have central axes that are disposed substantially parallel, and are longitudinally aligned. Lock apertures 163 facilitate releasably retaining closure 5b in a selected, partially open position, as described in greater detail below.

A second pair of lock apertures 164 are positioned in the interior surfaces of webs 50b at a location directly above elevated support surfaces 39b. Lock apertures 164 are laterally aligned, and are adapted to cooperate with eccentrics 11b to retain closure 5b in the fully closed and locked position.

The outer ends 153 of drive shafts 12b extend through wheels 11b, with their terminal end faces spaced laterally outwardly from wheels 11b, so as to define lock pins 165. Lock pins 165 have longitudinal axes disposed substantially parallel with the central axes of lock apertures 163 and 164, and are shaped to be closely received therein.

In operation, sunroof 2b is manipulated in the following fashion. In the fully closed and locked position illustrated in FIG. 42, wheels 11b are positioned on the elevated support surfaces 39b of tracks 30b, and inner drive shaft ends 154 are disposed in a substantially horizontal orientation. To unlock closure 5b, the user grasps the inner ends 154 of drive shafts 12b, and manually converges the same in the direction of the arrows in FIG. 45 by grasping them with a pinching action. The user then rotates inner ends 154 downwardly (in a clockwise direction as viewed in FIG. 42), so that they assume the generally vertical orientation illustrated in FIG. 41. With drive shaft ends 154 still pinchingly converged, the operator then pulls rearwardly on ends 154 to retract closure 5b to a selected, partially open position. The user then releases drive shaft ends 154, such that spring 158 resiliently urges drive shafts 12b outwardly, thereby inserting lock pins 165 into mating lock apertures 163. In the event that lock pins 165 do not align precisely with a selected pair of lock apertures 163, the user simply moves closure 5b either forwardly or rearwardly slightly, until lock pins 165 snap into place into an associated pair of lock apertures 163, thereby positively, yet releasably retaining closure 5b in the selected, partially open position.

To close closure 5b, the operator pinchingly grasps drive shaft ends 154 to converge the same, thereby disengaging lock pins 165 from associated lock apertures 163, and permitting closure 5b to be translated forwardly. Wheels 11b slide over the upper surfaces 160 of flanges 52b, until they engage ramps 162. Further forward translation of closure 5b lifts the forward edge 66b of window frame 64b upwardly, as wheels 11b ride over ramps 162 onto support surfaces 39b. The user then releases the inner ends 154 of drive shafts 12b, such that lock pins 165 diverge, and are received in mating lock apertures 164 to positively retain closure 5b in the fully closed position. Drive shaft ends 154 are then rotated upwardly (in a counterclockwise direction, as viewed in FIGS. 41 and 42) to a substantially horizontal orientation, which further raises closure 5b with respect to main frame 3b, and compresses seal 8b therebetween.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A sunroof comprising:
   a frame defining an opening;
   a retractable closure shaped to selectively close said opening;
   means for slidingly supporting said closure in said frame for translation between a fully open position and a fully closed position;
   means for adjustably retaining said closure in a partially open position, including:
      at least one track operably connected with said frame, and extending generally along one side of said frame in the direction of closure translation; said track having first and second oppositely oriented faces between which a track groove is defined; said first track face including a plurality of recesses disposed therein, having base surfaces with peak surfaces on opposite sides thereof; said track groove having a longitudinal axis, and a peak height measured between said second track face and the peak surfaces of said recesses;
      at least one cam mechanism operably connected with said closure at a side thereof disposed adjacent to said track; said cam mechanism including a drive shaft, and an eccentric operably connected with said drive shaft and rotating therewith; said eccentric being received in said track groove, and having a transverse axis with a width smaller than the peak height of said track groove, and a longitudinal axis with a length greater than the peak height of said track groove;
      means for rotating said drive shaft axially between an unlocked position wherein the longitudinal axis of said eccentric is oriented substantially parallel with the longitudinal axis of said track groove to permit translation of said closure to a selected, partially open position, and a locked position wherein the longitudinal axis of said eccentric is oriented substantially perpendicular to the longitudinal axis of said track groove, and an associated portion of said eccentric is received in one of said recesses;
      means for releasably locking said drive shaft against axial rotation in the locked position to positively retain said closure in the selected, partially open position.

2. A sunroof as set forth in claim 1, wherein:
   said track groove has a base height measured between said second track face and the base surfaces of said recesses; and
   said eccentric length is at least substantially commensurate with the base height of said track groove, whereby the associated portion of said eccentric is closely received in said recesses.

3. A sunroof as set forth in claim 2, wherein:
   said eccentric length is slightly greater than the base height of said track groove to wedgingly position said eccentric in said track groove in the locked position.

4. A sunroof as set forth in claim 3, including:
   a seal positioned between said closure and said frame; and
   means for raising said closure into a fully closed and locked position, wherein said closure, said seal, and said frame assume a sealing relationship.

5. A sunroof as set forth in claim 4, wherein:
   said first track face is disposed on a lower side of said track groove, below said second track face.

6. A sunroof as set forth in claim 5, wherein:
   said closure raising means includes at least one eccentric support surface positioned at one end of said track groove, disposed at an elevation above the base surfaces of said recesses, and being shaped to selectively, abuttingly support said eccentric thereon.

7. A sunroof as set forth in claim 6, wherein:
   said eccentric support surface is disposed in a pocket at a forward end of said track groove, and is positioned at an elevation above the peak surfaces of said recesses.

8. A sunroof as set forth in claim 7, wherein:
   said recesses are arranged in a substantially regularly spaced apart, side-by-side relationship along the longitudinal axis of said track groove.

9. A sunroof as set forth in claim 8, wherein:
   said eccentric includes a base at which said drive shaft is connected, and an arcuately shaped lobe; and
   said recesses are arcuately shaped to mate with and closely receive the lobe of said eccentric therein.

10. A sunroof as set forth in claim 9, wherein:
    said closure includes forward and rearward ends; and
    said cam mechanism is positioned adjacent to the forward end of said closure.

11. A sunroof as set forth in claim 10, wherein:

said track groove has an upwardly inclined ramp extending from the base surface of a forwardmost one of said recesses adjacent to said eccentric support surface.

12. A sunroof as set forth in claim 11, wherein:
said pocket is shaped to closely receive said eccentric therein to positively prevent said closure from opening without first rotating said eccentric out of the locked position.

13. A sunroof as set forth in claim 12, wherein:
said eccentric support surface is arcuately shaped to mate with the lobe of said eccentric.

14. A sunroof as set forth in claim 13, wherein:
said eccentric includes a notch disposed between said lobe and said base; and
said track includes a rear portion with a protruding resilient tab that is positioned for reception in the notch of said eccentric when said closure is in the fully open position to releasably retain said closure in the fully open position.

15. A sunroof as set forth in claim 14, wherein:
said track includes a normally, generally vertically oriented web extending between the first and second faces of said track groove.

16. A sunroof as set forth in claim 15, wherein said closure supporting means includes:
a channel extending longitudinally along said track web; and
a bearing operably connected with said eccentric, and extending laterally outwardly of said eccentric; said bearing being closely received in said track channel, and thereby slidingly supporting at least a portion of said closure on said frame.

17. A sunroof as set forth in claim 16, wherein said closure supporting means further includes:
a slide connected with said closure adjacent the rearward end thereof, and extending laterally outwardly from the side of said closure; and
a second track operably connected with said frame, and extending along one side of said closure; said second track including a channel in which said slide is received to slidingly support the rearward end of said closure on said frame.

18. A sunroof as set forth in claim 17, wherein said means for raising said closure further comprises:
an upwardly inclined ramp located in the forward end of said second track channel, which ramp is engaged by said slide and thereby lifts the rearward edge of said closure upwardly into abutting contact with said seal as said closure is moved forwardly into the fully closed and locked position.

19. A sunroof as set forth in claim 18, wherein:
said means for rotating said drive shaft comprises a handle operably connected with said drive shaft for manually rotating the same between the locked and unlocked positions.

20. A sunroof as set forth in claim 19, wherein:
said handle is attached directly to said drive shaft and rotates therewith.

21. A sunroof as set forth in claim 20, including:
a lock engaging said handle, and releasably and positively retaining the same in the selected, locked position to define at least a portion of said drive shaft locking means.

22. A sunroof as set forth in claim 21, wherein:
said pocket includes a vertically inclined forward wall to support said eccentric in an over-centered orientation in the fully closed and locked position.

23. A sunroof as set forth in claim 22, wherein:
said track rear portion comprises an arm which extends rearwardly in a cantilevered fashion, and said tab is disposed adjacent to a free end of said arm; said arm being resilient to permit flexure of said tab toward and away from said track groove;
said eccentric lobe being shaped to abut said arm adjacent the free end thereof as said drive shaft is rotated beyond the unlocked position to a postion beyond the unlocked, and thereby shift said tab out of engagement with said notch to permit forward sliding of said closure.

24. A sunroof as set forth in claim 1, including:
a seal positioned between said closure and said frame; and
means for raising said closure into a fully closed and locked position, wherein said closure, said seal, and said frame assume a sealing relationship.

25. A sunroof as set forth in claim 24, wherein:
said first track face is disposed on a lower side of said track groove, below said second track face.

26. A sunroof as set forth in claim 25, wherein:
said closure raising means includes an eccentric support surface positioned at one end of said track groove, disposed at an elevation above said first track face, and being shaped to selectively, abuttingly support said eccentric thereon.

27. A sunroof as set forth in claim 1, wherein:
said recesses are arranged in a substantially regularly spaced apart, side-by-side relationship along the longitudinal axis of said track groove.

28. A sunroof as set forth in claim 1, wherein:
said eccentric includes a base at which said drive shaft is connected, and an arcuately shaped lobe; and
said recesses are arcuately shaped to mate with and receive the lobe of said eccentric therein.

29. A sunroof as set forth in claim 1, wherein:
said closure includes forward and rearward ends; and
said cam mechanism is positioned adjacent to the forward end of said closure.

30. A sunroof as set forth in claim 1, wherein:
said eccentric includes a notch located at a medial portion thereof; and
said track includes a rear portion with a protruding resilient tab that is positioned for reception in the notch of said eccentric when said closure is in the fully open position, thereby releasably retaining said closure in the fully open position.

31. A sunroof as set forth in claim 30, wherein:
said track rear portion comprises an arm which extends rearwardly in a cantilevered fashion, and said tab is disposed adjacent to a free end of said arm; said arm being resilient to permit flexure of said tab toward and away from said track groove;
said eccentric being shaped to abut said arm adjacent the free end thereof as said drive shaft is rotated beyond the unlocked position to a position beyond the unlocked, and thereby shift said tab out of engagement with said notch to permit forward sliding of said closure.

32. A sunroof as set forth in claim 1, wherein:
said eccentric has a generally oblong shape with a base and a lobe positioned at opposite ends thereof.

33. A sunroof as set forth in claim 1, wherein:
said track includes a normally, generally vertically oriented web extending between the first and second faces of said track.

34. A sunroof as set forth in claim 33, wherein said closure supporting means includes:
   a channel extending longitudinally along said track web; and
   said eccentric includes a bearing, extending laterally outwardly thereof; said bearing being closely received in said track channel, and thereby slidingly supporting at least a portion of said closure on said frame.

35. A sunroof as set forth in claim 1, wherein:
   said means for rotating said drive shaft comprises a handle operably connected with said drive shaft for manually rotating the same between the locked and unlocked positions.

36. A sunroof as set forth in claim 35, wherein:
   said handle is attached directly to said drive shaft and rotates therewith.

37. A sunroof as set forth in claim 36, including:
   a lock engaging said handle, and releasably and positively retaining the same in the selected, locked position to define at least a portion of said drive shaft locking means.

38. A sunroof comprising:
   a frame defining an opening;
   a retractable closure shaped to selectively close said opening;
   means for slidingly supporting said closure in said frame for translation between a fully open position and a fully closed position;
   means for adjustably retaining said closure in a partially open position, including:
      at least one track operably connected with one of said frame and said closure, and extending generally along one side thereof in the direction of closure translation; said track having first and second oppositely oriented faces between which a track groove is defined; said first track face including a plurality of recesses disposed therein, having base surfaces with peak surfaces on opposite sides thereof; said track groove having a longitudinal axis, and a peak height measured between said second track face and the peak surfaces of said recesses;
      at least one cam mechanism operably connected with the other of said frame and said closure at a side thereof disposed adjacent to the one side of said one of said frame and said track; said cam mechanism including a drive shaft, and an eccentric operably connected with said drive shaft and rotating therewith; said eccentric being received in said track groove, and having a transverse axis with a width smaller than the peak height of said track groove, and a longitudinal axis with a length greater than the peak height of said track groove;
      means for rotating said drive shaft axially between an unlocked position wherein the longitudinal axis of said eccentric is oriented substantially parallel with the longitudinal axis of said track groove to permit translation of said closure to a selected, partially open position, and a locked position wherein the longitudinal axis of said eccentric is oriented substantially perpendicular to the longitudinal axis of said track groove, and an associated portion of said eccentric is received in one of said recesses;
      means for releasably locking said drive shaft against axial rotation in the locked position to positively retain said closure in the selected, partially open position.

39. A sunroof as set forth in claim 38, wherein:
   said track groove has a base height measured between said second track face and the base surfaces of said recesses; and
   said eccentric length is at least substantially commensurate with the base height of said track groove, whereby the associated portion of said eccentric is closely received in said recesses.

40. A sunroof comprising:
   a frame defining an opening;
   a retractable closure shaped to selectively close said opening; a seal positioned between said closure and said frame;
   means for slidingly supporting said closure in said frame for translation between an unlocked, fully open position and an unlocked, closed position;
   a releasable lock for shifting said closure from the unlocked, closed position into a fully closed and locked position in which said closure, said seal and said frame assume a sealing relationship; said lock including:
      at least one track operably connected with said frame, and extending generally along one side of said frame in the direction of closure translation; said track having upper and lower faces, each at a certain elevation, between which a track groove is defined;
      at least one cam mechanism operably connected with said closure at a side thereof disposed adjacent to said track; said cam mechanism including a drive shaft, and an eccentric operably connected with said drive shaft and rotating therewith; said eccentric being received in said track groove, and having a base at which said drive shaft is connected, a lobe, and opposite sides extending between said base and said lobe;
      a pocket positioned at one end of said track groove, and including a leading surface, and an eccentric support surface disposed at an elevation above the elevation of the lower face of that portion of said track groove adjacent said pocket said eccentric support surface being shaped to abuttingly support the lobe of said eccentric thereon;
      means for rotating said drive shaft axially between the unlocked, closed position wherein said eccentric is oriented generally horizontally in said track groove to permit translation of said closure toward the unlocked, fully open position, and the fully closed and locked position wherein one of the sides of said eccentric abuts the leading surface of said pocket to simultaneously lift said closure upwardly and forwardly, and shift said eccentric into a generally vertical orientation, with the lobe of said eccentric on the eccentric support surface of said pocket to raise said closure into the sealing relationship with said seal and said frame.

41. A sunroof as set forth in claim 40, wherein:
   said lobe is arcuately shaped; and said eccentric support surface is arcuately shaped to mate with said lobe.

42. A sunroof as set forth in claim 41, wherein:
   said pocket is shaped to closely receive said eccentric therein to prevent said closure from opening without first rotating said eccentric out of the fully closed and locked position.

43. A sunroof as set forth in claim 42, wherein:
said leading surface is disposed at an elevation above the eccentric support surface.

44. A sunroof as set forth in claim 43, wherein:
said pocket is shaped to retain said eccentric in a forwardly over-centered orientation when said closure is in the fully closed and locked position.

45. A sunroof as set forth in claim 40, wherein:
said pocket is shaped to closely receive said eccentric therein to prevent said closure from opening without first rotating said eccentric out of the fully closed and locked position.

46. A sunroof as set forth in claim 40, wherein:
said leading surface is disposed at an elevation above the eccentric support surface.

47. A sunroof as set forth in claim 40, wherein:
said pocket is shaped to retain said eccentric in a forwardly over-centered orientation when said closure is in the fully closed and locked position.

48. A sunroof comprising:
a frame defining an opening:
a retractable closure shaped to selectively close said opening;
means for slidingly supporting said closure in said frame for translation between a fully open position and a fully closed position;
means for releasably retaining said closure in the fully open position, including:
  at least one track operably connected with said frame, and extending generally along one side of said frame in the direction of closure translation; said track having upper and lower faces between which a track groove is defined; said track having a rearward portion at which one of said upper and lower faces includes an arm extending rearwardly therefrom in a cantilevered fashion; said arm having a tab positioned adjacent a free end of said arm, and protruding into said track groove; said arm being resiliently deformable to permit shifting of said tab toward and away from said track groove;
  at least one cam mechanism operably connected with said closure at a side thereof disposed adjacent to said track; said cam mechanism including a drive shaft, and an eccentric operably connected with said drive shaft and rotating therewith; said eccentric being received in said track groove, and having a transverse axis with a width smaller than the height of said track groove to permit fore-to-aft translation therein; said eccentric including a base at which said drive shaft is connected, a lobe opposite said base, and a notch at a medial portion of said eccentric between said base and said lobe; said notch being shaped to selectively receive said tab therein to securely lock said closure in the fully open position;
  means for rotating said drive shaft in a direction which causes the lobe of said eccentric to abut said arm at a location adjacent to the free end thereof; and disengage said tab from said notch to unlock said closure from the fully open position, and permit translation of said closure toward the fully closed position.

49. A sunroof as set forth in claim 48, wherein:
said tab includes a leading edge, a trailing edge, and an engagement edge disposed therebetween which is closely received in said notch.

50. A sunroof as set forth in claim 49, wherein:
said leading edge is arcuately shaped to abuttingly mate with the lobe of said eccentric.

51. A sunroof as set forth in claim 50, wherein:
said notch has a substantially rectangular side elevational shape.

52. A sunroof as set forth in claim 51, wherein:
said means for rotating said drive shaft comprises a handle operably connected with said drive shaft for manually rotating the same to disengage said tab from the notch of said eccentric.

53. A sunroof as set forth in claim 52, wherein:
said handle is attached directly to said drive shaft and rotates therewith.

54. A sunroof as set forth in claim 48, wherein:
said means for rotating said drive shaft comprises a handle attached directly to said drive shaft for manually rotating the same to disengage said tab from the notch of said eccentric.

55. In a sunroof of the type having a frame defining an opening, a retractable closure shaped to selectively close said opening, a seal positioned between said closure and said frame, and means for slidingly supporting said closure in said frame for translation between a fully open position and a fully closed position, the improvement of a combination closure lock comprising:
a first lock for releasably retaining said closure in a selected, partially open position, including:
  first and second tracks operably connected with said frame and extending along opposite sides of said closure; said tracks each having first and second oppositely oriented faces at first and second elevations respectively, between which track grooves are defined;
  said first track faces including a plurality of recesses disposed therein, having base surfaces with peak surfaces on opposite sides thereof; said track grooves each having a longitudinal axis, and a peak height measured between said second track faces and the peak surfaces of said recesses;
  first and second cam mechanisms operably connected with said closure at opposite sides thereof; said cam mechanisms each including a drive shaft and an eccentric operably connected with said drive shaft and rotating therewith; said eccentrics being received in an associated one of said track grooves, and having transverse axes with a width smaller than the peak height of said track grooves, and longitudinal axes with a length greater than the peak height of said track grooves;
  means for rotating said drive shafts axially between an unlocked position wherein the longitudinal axes of said eccentrics are oriented substantially parallel with the longitudinal axis of the associated one of said track grooves to permit translation of said closure to a selected partially open position, and a locked position wherein the longitudinal axis of each of said eccentrics is oriented substantially perpendicular to the longitudinal axis of the associated one of said track grooves, and associated portions of said eccentrics are received in associated recesses in said tracks;
  means for releasably locking said drive shafts against axial rotation in the locked position to positively retain said closure in the selected, partially open position;

a second lock for raising said closure from a closed and unlocked position, into a fully closed and locked position in which said closure, said seal and said frame assume a sealing relationship; said second lock comprising:

first and second pockets positioned at corresponding ends of said track grooves, and including eccentric support surfaces disposed at an elevation above the elevation of a lower one of said first and second faces that portion of said track groove adjacent said pockets; said eccentric support surfaces being shaped to abuttingly support said eccentrics thereon, whereby when said closure is in the closed and unlocked position, rotation of said eccentrics into the fully closed and locked position lifts said eccentrics into said pockets, thereby raising at least one end of said closure into the sealing relationship with said seal and said frame.

56. A sunroof as set forth in claim 55, wherein:

each said eccentric includes at least one bearing extending laterally outwardly thereof; and said tracks include webs with longitudinally extending channels that include upper and lower surfaces in which said bearings are received to slidingly support said closure, and define at least a portion of said closure supporting means.

57. A sunroof as set forth in claim 56, wherein:
said track channels have upwardly inclined forward ends which are shaped such that when said closure is in the fully closed and locked position, said bearings do not engage the upper surfaces of said track channels, thereby insuring maximum sealing contact between said closure and said seal.

58. A sunroof as set forth in claim 57, wherein:
said eccentrics each include a base and an arcuately shaped lobe; and
said recesses are arcuately shaped to mate with and closely receive therein the lobe of said eccentrics.

59. A sunroof as set forth in claim 58, wherein:
said closure includes forward and rearward ends;
said cam mechanisms are positioned adjacent to the forward end of said closure; and
said drive shaft rotating means comprises a handle operably connected with said drive shafts to rotate the same together for manual operation of said sunroof.

60. A sunroof as set forth in claim 59, wherein:
said eccentrics each include a notched medial portion located between said lobe and said base; and
said tracks include rearwardly extending, resilient arms with tabs protruding toward said track grooves that are positioned for reception in the notched medial portions of said eccentrics when said closure is in a fully open position, thereby releasably retaining said closure in the fully open position.

61. A sunroof as set forth in claim 60, wherein:
said lobes of said eccentrics are oriented toward the forward end of said closure when said closure is in the fully open position, and are shaped to abut said arms upon rotation of said drive shafts toward the unlocked position to disengage said tabs from said notches, and thereby permit translation of said closure toward the fully closed position.

62. A sunroof as set forth in claim 55, wherein:
said eccentrics each include a base and an arcuately shaped lobe; and
said recesses are arcuately shaped to mate with and closely receive the lobe of each of said eccentrics therein.

63. A sunroof as set forth in claim 55, wherein:
said closure includes forward and rearward ends;
said cam mechanisms are positioned adjacent to the forward end of said closure; and
said drive shaft rotating means comprises a handle operably connected with said drive shafts to rotate the same together for manual operation of said sunroof.

64. A sunroof as set forth in claim 55, wherein:
said eccentrics each include a base at which one of said drive shafts is connected, a lobe opposite said base, and a notched medial portion located between said lobe and said base; and
said tracks include rearwardly extending, resilient arms with tabs protruding toward said track grooves that are positioned for reception in the notched medial portions of said eccentrics when said closure is in a fully open position, thereby releasably retaining said closure in the fully open position.

65. A sunroof as set forth in claim 55, wherein:
said eccentrics each include a base at which an associated one of said drive shafts is attached, a lobe positioned generally opposite said base, and a notched medial portion located between said lobe and said base;
said tracks include rearwardly extending, resilient arms with tabs protruding toward said track grooves that are positioned for reception in an associated notched medial portion of said eccentrics when said closure is in a fully open position, thereby releasably retaining said closure in the fully open position; and
said lobe of each of said eccentrics is oriented toward the forward end of said closure when said closure is in the fully open position, and is shaped to abut an associated one of said arms upon rotation of said drive shafts beyond the unlocked position to disengage said tabs from said notches, and thereby permit translation of said closure toward the fully closed position.

* * * * *